US011483460B2

(12) United States Patent
Shahparnia et al.

(10) Patent No.: US 11,483,460 B2
(45) Date of Patent: Oct. 25, 2022

(54) MULTI-COIL VOICE COIL MOTOR DRIVE ARCHITECTURE

(71) Applicant: Apple Inc., Cupertino, CA (US)

(72) Inventors: Shahrooz Shahparnia, Monte Sereno, CA (US); Anish Bhide, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/221,754

(22) Filed: Apr. 2, 2021

(65) Prior Publication Data

US 2021/0314469 A1 Oct. 7, 2021

Related U.S. Application Data

(60) Provisional application No. 63/005,956, filed on Apr. 6, 2020.

(51) Int. Cl.
| | |
|---|---|
| *H04N 5/225* | (2006.01) |
| *G02B 7/09* | (2021.01) |
| *G03B 5/04* | (2021.01) |
| *G03B 5/06* | (2021.01) |
| *G03B 13/36* | (2021.01) |

(52) U.S. Cl.
CPC ............. *H04N 5/2254* (2013.01); *G02B 7/09* (2013.01); *G03B 5/04* (2013.01); *G03B 5/06* (2013.01); *G03B 13/36* (2013.01); *H04N 5/2253* (2013.01); *G03B 2205/0069* (2013.01)

(58) Field of Classification Search
CPC ...... H04N 5/2254; H04N 5/2253; G02B 7/09; G02B 7/08; G02B 27/646; G03B 5/04; G03B 5/06; G03B 13/36; G03B 2205/0069; G03B 2205/0015; G03B 3/10; G03B 5/02; H02K 41/0356
See application file for complete search history.

(56) References Cited

U.S. PATENT DOCUMENTS

| | | |
|---|---|---|
| 9,013,588 B2 | 4/2015 | Moriya et al. |
| 9,025,945 B2 | 5/2015 | Nomura et al. |
| 9,036,260 B2 | 5/2015 | Sugawara |
| 10,063,752 B2* | 8/2018 | Topliss ................ G02B 27/646 |
| 2012/0008220 A1* | 1/2012 | Lee .......................... H02K 5/04 359/822 |
| 2016/0231528 A1* | 8/2016 | Wong ........................ G02B 7/36 |
| 2017/0118408 A1* | 4/2017 | Gregory ............... G02B 27/646 |
| 2019/0058423 A1* | 2/2019 | Knoedgen ............... H02P 6/182 |

(Continued)

*Primary Examiner* — Padma Haliyur
(74) *Attorney, Agent, or Firm* — Robert C. Kowert; Kowert, Hood, Munyon, Rankin & Goetzel, P.C.

(57) ABSTRACT

A camera system may include one or more voice coil motor (VCM) actuators to implement focus, tilt and shift functions. The VCM actuators may include coils segmented into multiple coil segments having individually impedances lower than the impedance of the respective coil as a whole.
The coil segments may be individually driven by respective currents at different points in time to interact with magnet(s) to produce motive forces along the same axis. Based on the winding configuration and driving mode of the coil segments, the motive forces may move a lens group relative to an image sensor in a direction substantially orthogonal to an image plane, tilt the lens group relative to the image sensor, or shift the image sensor relative to the lens group on the image plane.

20 Claims, 17 Drawing Sheets

(56) References Cited

U.S. PATENT DOCUMENTS

| | | |
|---|---|---|
| 2019/0101808 A1 | 4/2019 | Byon et al. |
| 2020/0041756 A1* | 2/2020 | Kao .................. G02B 7/09 |
| 2020/0235649 A1* | 7/2020 | Hayward ............ H02K 33/16 |
| 2020/0268233 A1* | 8/2020 | Shimoyama ....... A61B 1/00057 |

* cited by examiner

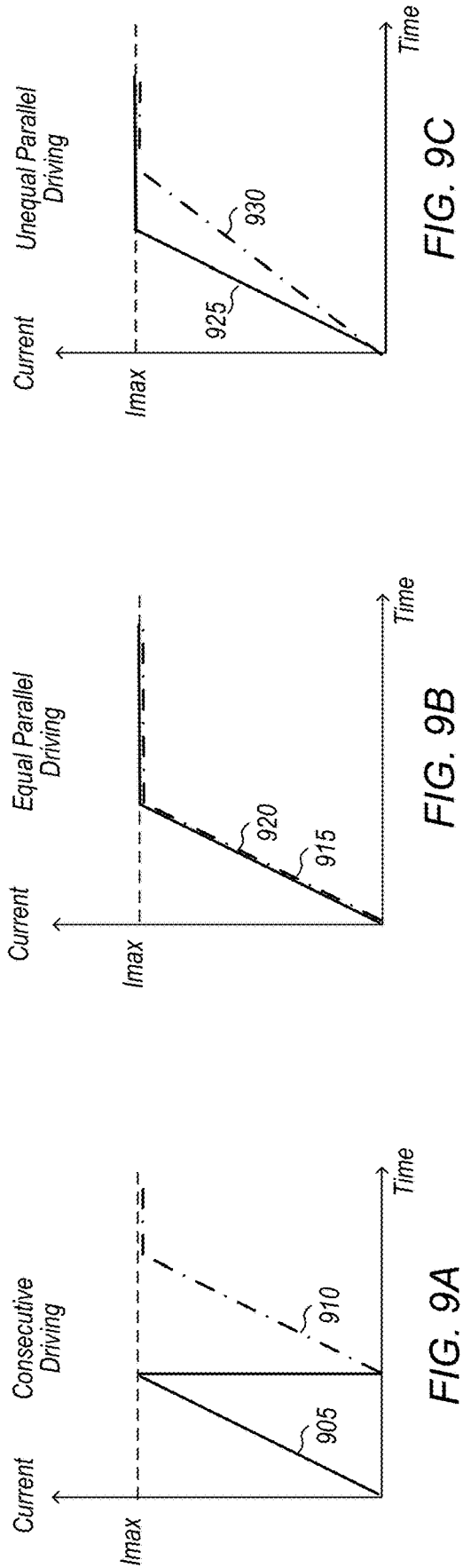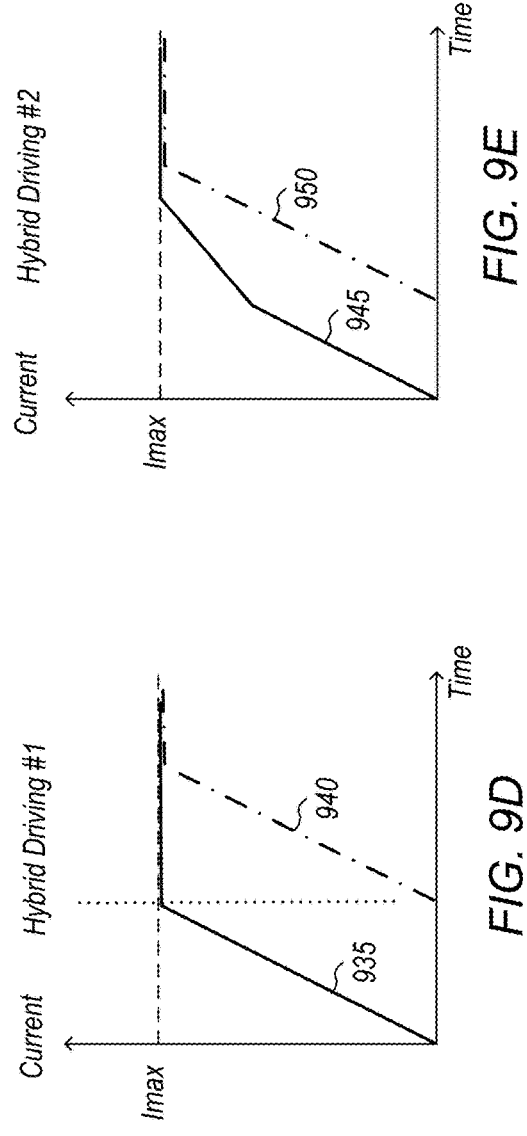

MULTI-COIL VOICE COIL MOTOR DRIVE ARCHITECTURE

This application claims benefit of priority to U.S. Provisional Application Ser. No. 63/005,956, entitled "Multi-Coil Voice Coil Motor Drive Architecture," filed Apr. 6, 2020, and which is incorporated herein by reference in its entirety.

BACKGROUND

Technical Field

This disclosure relates generally to a camera actuator and more specifically to a voice coil motor (VCM) camera actuator including multiple coil segments.

Description of the Related Art

The advent of mobile multipurpose devices such as smartphones, tablet or pad devices has resulted in a need for more complicated cameras for integration in the devices. For instance, in recent years, manufacturers have added more and more lenses to the cameras to improve film quality. Generally, a camera may use an actuator, such as a voice coil motor (VCM) actuator, to move the lenses relative to an image sensor. As the cameras become more complicated, they become bigger and heavier, and more powerful actuators are needed to deliver the required motive force. Traditional VCM actuators can be power-limited due to the size and energy source limitations associated with mobile devices. Thus, it is desirable to have VCM actuators with more efficient architectures to boost output power.

BRIEF DESCRIPTION OF THE DRAWINGS

FIGS. 9A-9E illustrates various example current regulation schemes of an actuator, according to some embodiments.

Figure 1:
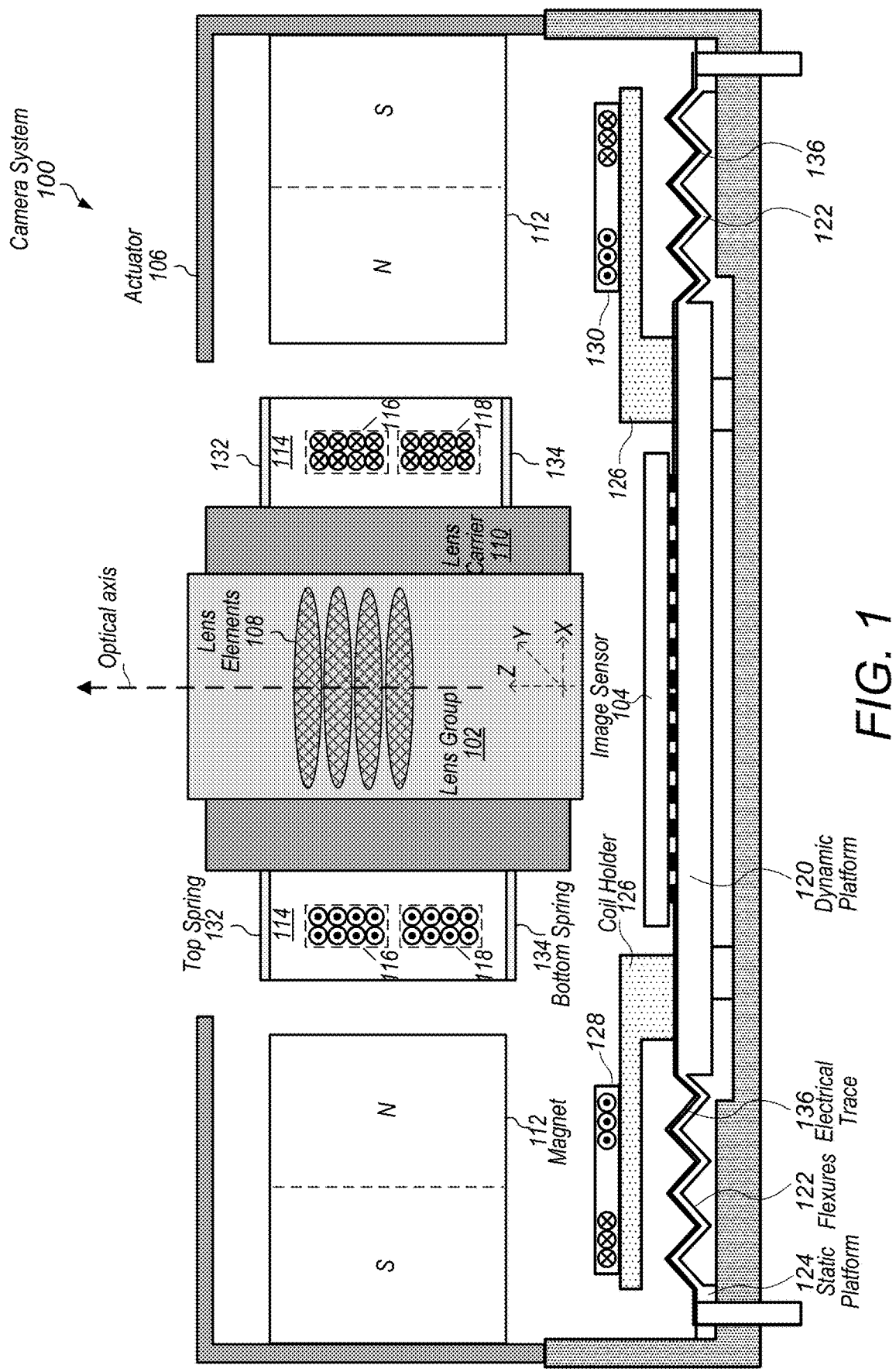
FIG. 1 illustrates a schematic side view of an example camera system, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

The advent of mobile multipurpose devices such as smartphones, tablet or pad devices has resulted in a need for more complicated cameras for integration in the devices. For instance, in recent years, manufacturers have added more and more lenses to the cameras to improve film quality. Generally, a camera may use an actuator, such as a voice coil motor (VCM) actuator, to move the lenses relative to an image sensor. As the cameras become more complicated, they become bigger and heavier, and more powerful actuators are needed to deliver the required motive force. VCM actuators generate motive force based on the electromagnetic interactions between the current in the actuator's coil and a magnetic field. The motive force, also called Lorentz force, is proportional to the strength of the magnetic field, the number of turns and length of the coil, and amplitude of the current. Increasing the strength of the magnetic field, the number of turns or length of the coil would also increase the size of the VCM actuator. This is infeasible for most mobile devices that prefer small form factor cameras. On the other hand, it is also challenging, if not impossible, to increase the current of the VCM actuators because they are generally powered by energy resources such as batteries. For a coil of a given impedance, the current could be restricted by the maximum supply voltage of the batteries. Thus, it is desirable to have VCM actuators with more efficient architectures to boost output power.

Various techniques are described in this disclosure for a camera system including a VCM camera actuator with segmented coils. In some embodiments, the VCM actuator may include multiple coil segments to move a lens group relative to an image sensor along an optical axis to implement autofocus (AF) movement and tilt actions. In some embodiments, the VCM actuator may include multiple coil segments to move the image sensor relative to the lens group along axes orthogonal to the optical axis to perform the image sensor shift or optical image stabilization (OIS) actions. Compared to traditional VCM actuators, the disclosed VCM actuator segments a coil, such as an AF and/or OIS coil, into multiple segments each having an impedance less than the total impedance of the coil as a whole. The coil segments may be individually driven by respective currents. Thus, the VCM actuator may achieve larger currents in the coil segments for a given supply voltage and thus result in larger motive forces.

FIG. 1 illustrates a schematic side view of an example camera system, in accordance with some embodiments. In FIG. 1, the camera system 100 may include a lens group 102, an image sensor 104, and an actuator 106. For purposes of illustration, a three-dimensional coordinate system including X-Y-Z axes may be defined for analysis of the camera optical system, where an optical axis of the one or more lenses of lens group 102 is defined as Z-axis. In some embodiments, the actuator 106 may comprise one or more voice coil motor (VCM) actuators. In some embodiments, the lens group 102 may include one or more lens elements 108. Each lens element 108 may be, for instance, a piece of glass or other transparent substance with flat and/or curved sides for concentrating or dispersing light rays. In some embodiments, the VCM actuator 106 may include a lens carrier 110 that may be configured to hold the lens elements 108 of the lens group 102. For instance, the lens carrier 110 may be configured to have inside threads so that the lens elements 108 may be screwed into the lens carrier 110. In some embodiments, the VCM actuator 106 may include one or more magnets 112 and one or more coil structures 114. The coil structures 114 may include a coil segmented into multiple coil segments, e.g., coil segments 116 and 118. The coil structures 114 may be configured to attach to the lens carrier 110. For instance, the coil segments 116 and 118 may be contained inside coil structure 114 that is attached with lens carrier 110 and wound surrounding a perimeter of the lens carrier 110. The coil segments 116 and 118 may be proximate the magnets 112. The coil segments 116 and 118 may be individually driven by respective currents, which may electromagnetically interact with the magnetic fields of the magnets 112 to create the motive forces (or Lorentz forces). For given magnetic field and current-conducting coil segment, the motive force may be determined as F=BILN, where F is the motive force, B represents the strength or magnetic flux density of the magnetic field, I is the amplitude of the current, L is the length of the wire that cuts the flux lines, and N refers to the number of turns of the coil segment's winding. The direction of the motive force may be decided based on the right-hand rule. Because the coil segments 116/118 and coil structures 114 are attached to the lens carrier 110, which in turn carries the lens group 102 and lens elements 108, the motive forces may move the lens group and lens elements 108, e.g., along the optical axis (or Z-axis) of the lens group. In some embodiments, the movement of the lens group and lens elements 108 along the optical axis may perform various focus functions, for instance, when the camera system 100 focuses on or off an object in view. Thus, the coil segments 116 and 118 may be also named AF coil segments.

In this example, the currents in the coil segments 116 and 118 may be illustrated by the 'dots' in each wire of coil segments 116/118 in FIG. 1 indicating currents coming out of the page, whilst the 'crosses' in each wire of the other half of coil segments 116 and 118 indicating currents going into the page. Thus, the coil segments 116/118 may be wound around a perimeter of the lens group 102 on the image plane (or X-Y plane). Further, in FIG. 1, the coil segments 116 and 118 may be wound in a single-layer configuration in which the coil segment 116 is disjoint from the coil segment 118. As described below in more detail, the coil segments 116 and 118 may be wound in various alternative configures. For instance, the coil segments 116 and 118 may be wound in a double-layer configuration in which the coil segment 116 overlaps the coil segment 118—e.g., one coil segment stays on top of the other coil segment. In some embodiments, the coil segments 116 and 118 may be wound in a partial double-layer configuration where the coil segment 116 partially overlaps the coil segment 118—e.g., one portion of the coil segment 116 overlaps one portion of the coil segment 118, and the other portions of the coil segments are disjoint from each other. Besides wound around the perimeter of the lens group 103, the coil segments 116 and 118 may be wound in a concentrated configuration. In the concentrated configuration, the coil segments 116 and 118 may be disposed adjacent to respective magnets and wound on the Y-Z plane (rather than X-Y plane) that is orthogonal to the optical axis (i.e., Z-axis) of the lens group 102.

As described above, the electromagnetic interactions between the coil segments 116/118 and the magnetic fields of magnets 112 may create motive forces along the same axis, e.g., the optical axis of the lens group 102. The motive forces may move the lens group 102 relative to the image sensor 104 along the optical axis. In some embodiments, the coil segments 116 and 118 may be individually driven by respective currents to generate motives forces of different values and polarities. The different motive forces may cause the lens group 102 to tilt relative to the image sensor 104. For instance, the lens may tilt clockwise or counter-clockwise on the Z-X plane defined by the Z-X axes to an angle with respect to the optical axis (or Z-axis).

In some embodiments, the VCM actuator 106 may include a top spring 132 and/or a bottom spring 134. The top spring 132 and the bottom spring 134 may serve as mechanical as well as electrical connections. For instance, the top spring 132 and bottom spring 134 may provide mechanical support and connect the lens carrier 110 (through the coil structures 114) with one or more other static components of the camera system 100. In some embodiments, the top spring 132 and bottom spring 134 may be coupled to one or more suspension wires (not shown). In some embodiments, the actuator 106 may pass currents from a supply voltage to the coil segments 116 and 118 through the suspension wires, the top spring 132 and the bottom spring 134. Alternatively, in some embodiments, camera 100 may use one or more circuit boards or other components, instead of the suspension wires, to deliver the currents for coil segments 116 and 118. In some embodiments, a circuit board may include a rigid circuit board (e.g., a printed circuit board), a flexible circuit board, or a rigid-flex circuit board (including both rigid and flexible portions).

In some examples, the VCM actuator 106 may include a dynamic platform 120 configured to hold the image sensor 104. One or more sets of flexures 122 may mechanically connect the dynamic platform 120 to a static platform 124. The flexures 122 may provide freedom for movement of the dynamic platform 120. The dynamic platform 120 may include coil holders 126 configured to hold a coil segmented into one or more coil segments 128 and 130. The coil segments 128 and 130 may be placed proximate the magnets 112 (or other actuator magnets). The coil segments 128 and 130 may also be individually driven by respective currents, which are illustrated by the 'dots' in each wire of coil segments 128 and 130 indicating currents coming out of the page, whilst the 'crosses' in each wire of the other half of coil segments 128 and 130 indicating currents going into the page. The currents in coil segments 128 and 130 may interact with the magnets 112 to produce motive forces that cause the dynamic platform 120, together with the image sensor 104, to move relative to the lens group 102 on the image plane (or X-Y plane) along one or more axes (e.g., X- and Y-axis) that are orthogonal to the optical axis of the lens group 102. In some embodiments, the shift of the image sensor 104 on the image plane may perform various optical image stabilization (OIS) functions for the camera system 100. Thus, the coil segments 128 and 130 may be also named OIS coil segments. In some embodiments, the flexures 122 may include electrical traces 136 configured to route image signals from the image sensor 104 to the static platform 124. Furthermore, the static platform 124 may be configured to route the image signals to a flex (not shown). Additionally, the electrical traces 136 may be configured to connect the coil segments 128 and 130 to a supply voltage. In this example, because the actuator 106 splits the AF coil and OIS coil into multiple coil segments 116/118 and 128/130, each of the coil segments may possess an impedance less than the total impedance of the respective AF and OIS coil as a whole. Further, the coil segments 116/118 and 128/139 may be individually driven by respective currents. Thus, for a given supply voltage, due to the smaller impedances, the coil segments may create larger motives forces that, when added together, may result in even stronger motive forces for the camera system 100.

Figure 2:
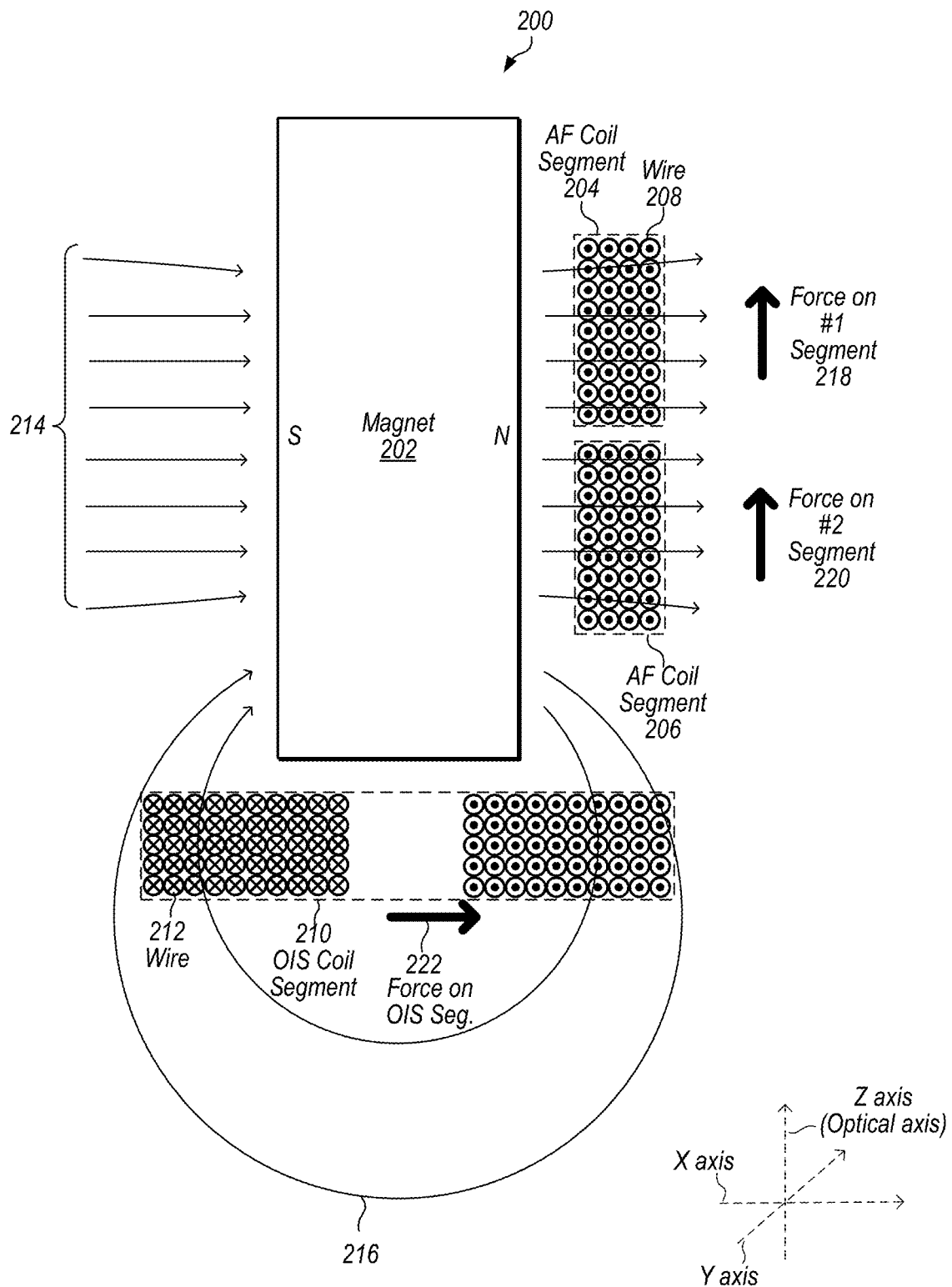
FIG. 2 illustrates an example coil segment configuration of an actuator, according to some embodiments.

FIG. 2 shows an example coil segment configuration of an actuator, according to some embodiments. FIG. 2 represents a cross-section view through one magnet 112, coil segments 116 and 118, and one OIS coil segment 128 of the actuator 106 in FIG. 1. As shown in FIG. 2, the actuator 200 may include a magnet 202, two AF coil segments 204 and 206, and one OIS coil segment 210. The coil segments 204 and 206 may be wound around the perimeter of the lens group, e.g., the lens group 102 in FIG. 1. In this example, the coil segments 204 and 206 are shown as a single-layer configuration where the coil segment 204 is disjoint from the coil segment 206 without any overlap. The magnet 202 may create a magnetic field 214. The coil segments 204 and 206 may pass currents through wires 208, which may interact with the magnetic field 214 to produce motive forces 218 and 220 on the respective coil segment 204 and 204. In this example, given the arrangement of the polarities of the magnet 202 and currents in coil segments 204 and 206, the two motive forces 218 and 220 are along the same axis, e.g., the optical axis, in the upward direction. Thus, the actual AF motive force created by the actuator 200 may include a sum of the two motive forces 218 and 220. The AF motive force may move the lens groups, e.g., the lens group 102, relative to the image sensor, e.g., the image sensor 104 sitting on the image plane.

In some embodiments, the magnet 202 may create a fringing magnet field 216 cutting through the current-conducting wires 212 of the coil segment 210. The OIS coil segment 210 may be driven by current flowing through wires 212 to cause motive force 222 to enable the shift function of the camera system. As indicated by the 'dots' and 'crosses', the current may go into the page in the left-half wires 212 of the coil segment 210 and come out of the page in the right-half wires 212 of the coil segment 210. The current may interact with the fringing magnetic field 216 to create the motive force 222 along an axis, e.g., the X-axis, that is orthogonal to the optical axis, in this example. The motive force 222 may shift the image sensor sitting on the image plane (or X-Y plane) relative to the lens group of the camera system. For purposes of illustration, the coil segments 204 and 206 are shown to have the same number of turns in FIG. 2. In some embodiments, the coil segments 204 and 206 may have respective numbers of turns different from each other.

Figure 3:
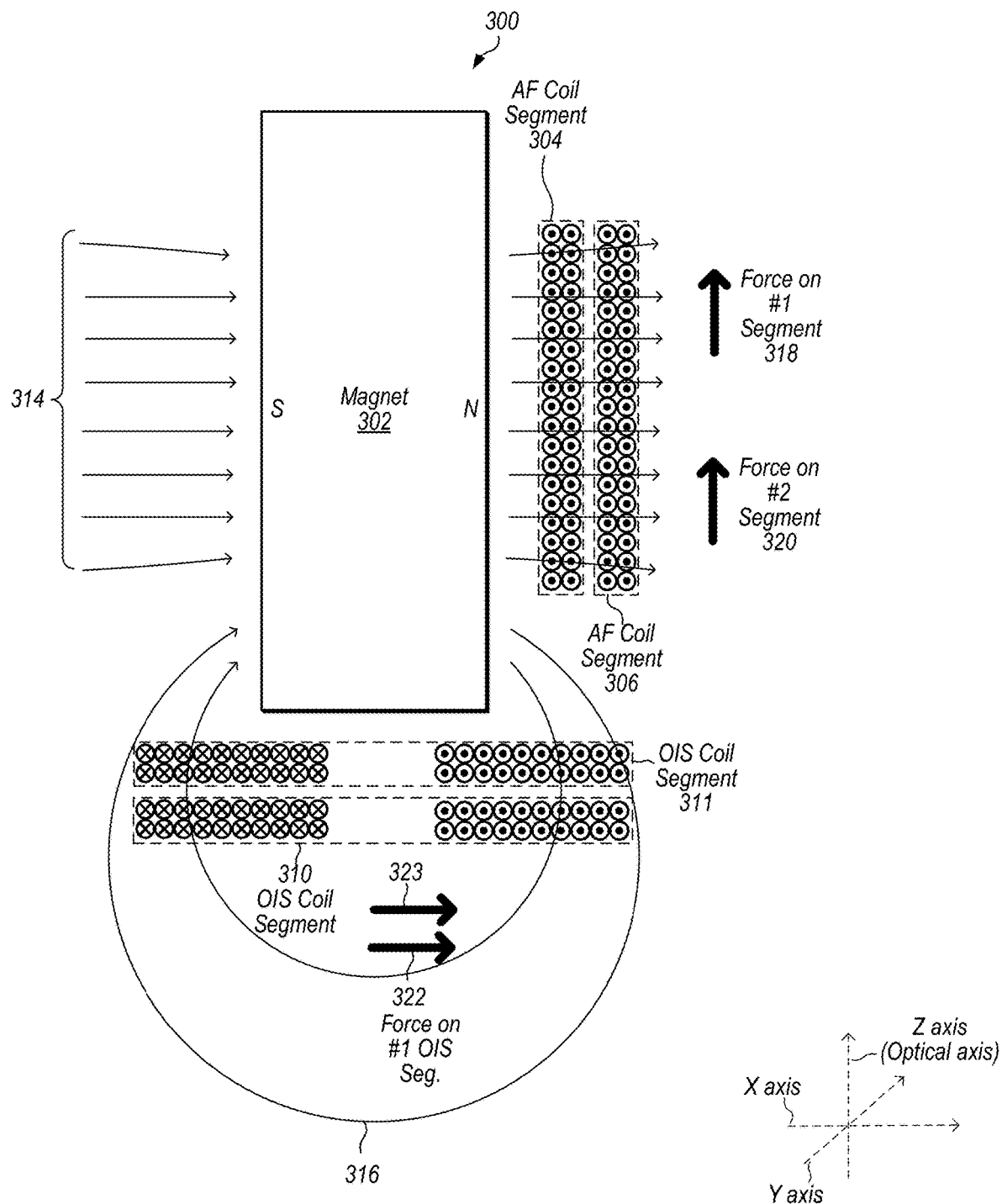
FIG. 3 illustrates another example coil segment configuration of an actuator, according to some embodiments.

FIG. 3 shows another example coil segment configuration of an actuator, according to some embodiments. In FIG. 3, the coil segments 304 and 306 of the actuator 300 may be wound in a double-layer configuration so that one coil segment overlaps the other. In some embodiments, the actuator 300 may segment the OIS into multiple coil segments, e.g., coil segment 310 and 311. In this example, the coil segments 310 and 311 overlap each other in a double-layer configuration. Similar to FIG. 2, the coil segments 304 and 306 may interact with the magnetic field 314 of the magnet 302 to produce motive forces 318 and 320 along the same axis (e.g., the Z-axis), whilst the coil segments 310 and 311 interact with the fringing magnetic field 316 to generate motives forces 322 and 323 along the same axis (e.g., the X-axis). As described above, the coil segments 304/306 and 310/311 may be driven with respective currents separately. Further, the coil segments 304/306 and 310/311 may have numbers of turns different from each other.

Figure 4:
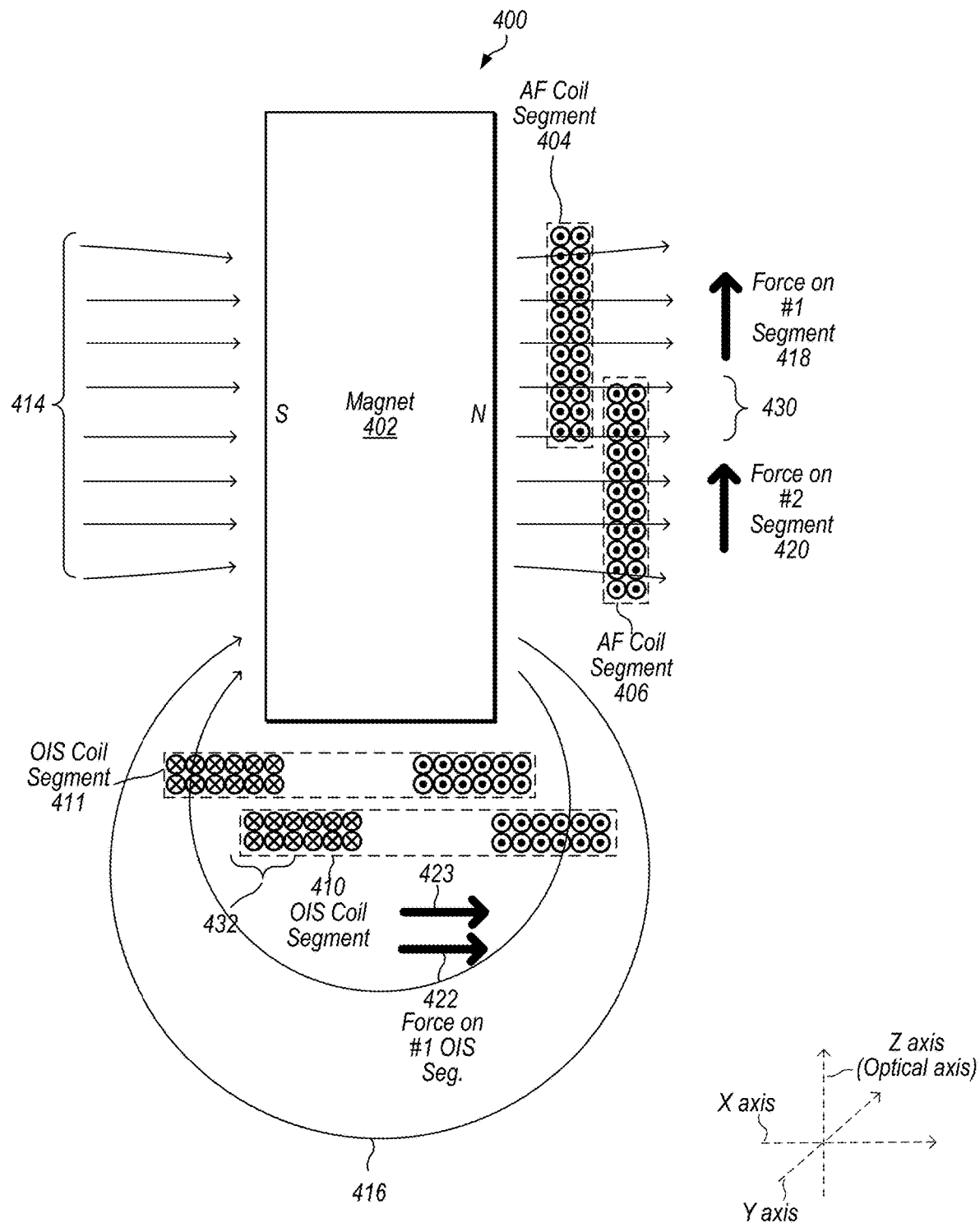
FIG. 4 illustrates another example coil segment configuration of an actuator, according to some embodiments.

FIG. 4 shows another example coil segment configuration of an actuator, according to some embodiments. In FIG. 4, the coil segments 404 and 406 (and coil segments 410 and 411) of the actuator 400 may be wound in a partial double-layer configuration such that the coil segments 404 and 406 (and coil segments 410 and 411) may partially overlap each other. For instance, the coil segments 404 and 406 may share an overlapping portion 430, while the coil segments 410 and 411 may have an interwound portion 432. Similar to FIGS. 2-3, the coil segments 404 and 406 may interact with the magnetic field 414 of the magnet 402 to produce motive forces 418 and 420 along the same axis (e.g., the Z-axis), whilst the coil segments 410 and 411 interact with the fringing magnetic field 416 to generate motives forces 422 and 423 along the same axis (e.g., the X-axis). As described above, the coil segments 404/406 and 410/411 may be driven with respective currents separately. Further, the coil segments 404/406 and 410/411 may have numbers of turns different from each other.

Figure 5:
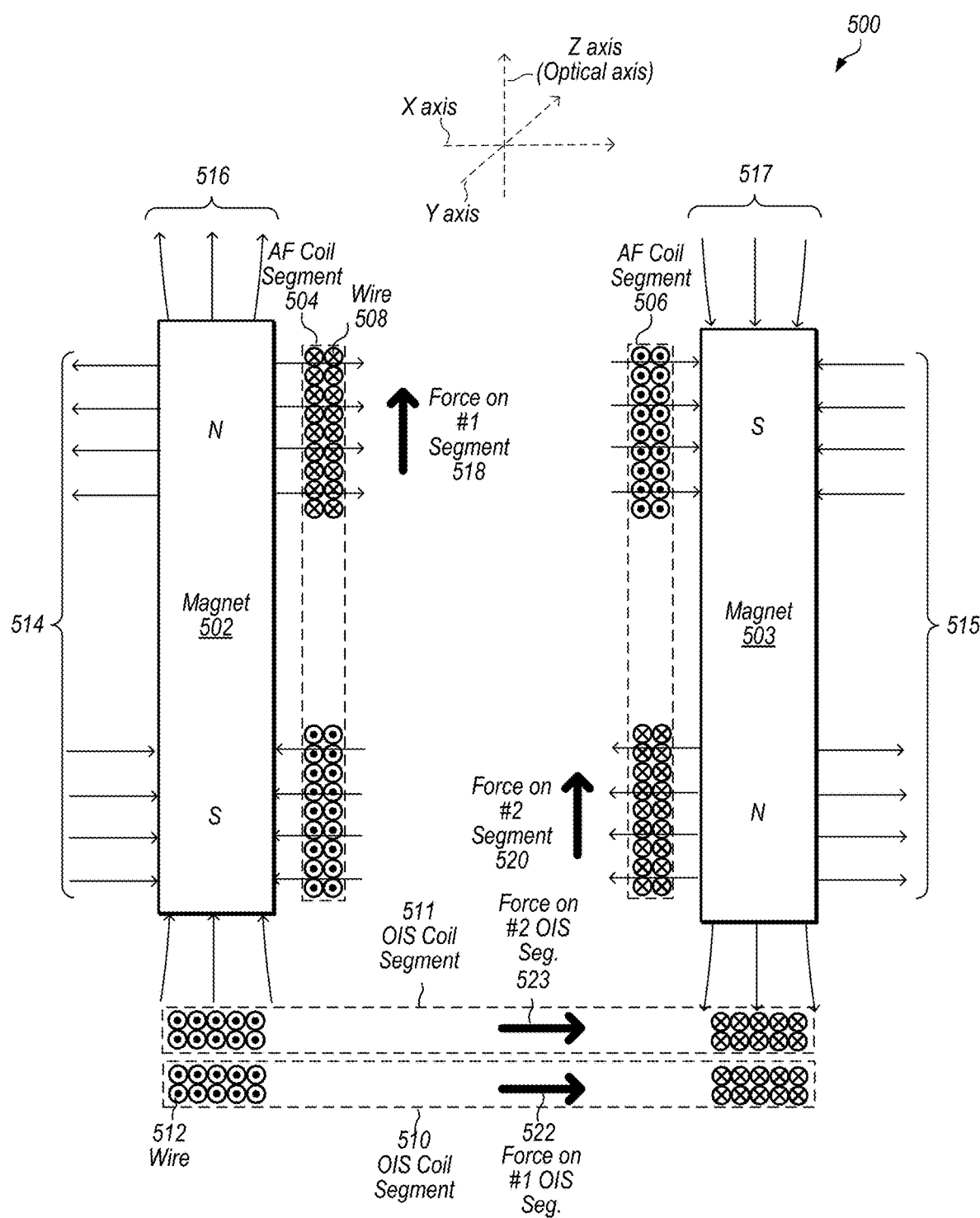
FIG. 5 illustrates another example coil segment configuration of an actuator, according to some embodiments.

FIG. 5 shows another example coil segment configuration of an actuator, according to some embodiments. In FIG. 5, the actuator 500 may include coil segments 505 and 506, each wound "concentratedly" adjacent to respective magnets 502 and 503. Unlike the winding configurations in FIGS. 1-4 where the coil segments are wound around the lens group on the X-Y plane, the concentrate coil segments 505 and 506 may be affixed at an orientation such that the plane of the coil segments 505 and 506 (e.g., the Y-Z plane) is orthogonal to the optical axis (e.g., the Z-axis) of the lens group. Moreover, when a coil segments winds around the perimeter of the lens group, the coil segment may interact with all the magnets disposed around the actuator. However, in the concentrated configuration, coil segments 505 and 506 may primarily interact with only their respective adjacent magnets 502 and 503. For instance, in FIG. 5, the coil segment 504 is disposed proximate to magnet 502, and thus it primarily interacts with the magnetic field 514 of the magnet 502 to produce the motive force 518 along the optical axis. Similarly, the coil segment 506 is placed adjacent to the magnet 503, and thus it primarily interacts with the magnetic field 515 of the magnet 503 to produce the motive force 520 along the same axis, e.g., the optical axis. The same analysis may apply to the OIS coil segments 510 and 511 to cause motive forces 522 and 523 along the same axis, e.g., the X-axis that is orthogonal to the optical axis of the lens group.

As described above, the coil segments 504/506 and 510/511 may be individually driven by respective currents. In some embodiments, the coil segments 504 and 506 may be configured to produce motive forces 518 and 520 of different amount. For instance, the actuator 500 may produce a larger motive force 518 on the coil segment 504 than the motive force 520 on the coil segment 506. Because the coil segments 504 and 506 are mounted on different sides of the lens group, rather than around the perimeter of the lens group, the different motive forces 518 and 520 may cause the lens group to tilt. In this example, when the motive force 518 is larger than the motive force 520, the lens groups (and lens elements), e.g., the lens group 102 (and lens elements 108) in FIG. 1, may tilt clockwise relative to the image sensor, e.g., the image sensor 104 in FIG. 1, to an angle with respective to the optical axis. In some embodiments, the coil segments 504 and 506 may be configured to produce motive forces 518 and 520 of different polarity. For instance, the actuator 500 may produce a downward motive force 518 on the coil segment 504 and an upward the motive force 520 on the coil segment 506. The different motive forces 518 may similarly cause the lens group to tilt relative to the image sensor. In this example, the lens group may tilt counter-clockwise relative to the image sensor, e.g., the image sensor 104 in FIG. 1, to an angle with respective to the optical axis. Similar to FIG. 2, the motive forces created by the OIS coil segments 522/523 may cause the image sensor sitting on the image plane to shift relative to the lens group. In other words, the AF coil segments 504 and 506 may perform the focus and tilt on the lens group relative to the image sensor, while the OIS coil segments 510 and 511 may cause the image sensor shift relative to the lens group. The actions, in combination, may produce a focus tilt-shift camera system. For purposes of illustration, FIG. 5 shows only one coil segment (e.g., coil segments 504 and 506) respectively for magnets 502 and 503. In some embodiments, the actuator 500 may include multiple coil segments concentratedly proximate each of the magnets. For instance, the actuator 500 may include coil segments 504a and 506b (not shown), configured in a single layer, a double layer, or a partial double layer configuration, in the Y-Z plan proximate magnet 502. The two coil segments 504a and 504b may interact respectively with magnet 502 to produce motive forces along the axis or Z-axis. Similarly, although FIG. 5 depicts two OIS coil segments 510 and 511. In some embodiments, the actuator 500 may include less or more coil segments for movement the image sensor of the camera.

Figure 6A:
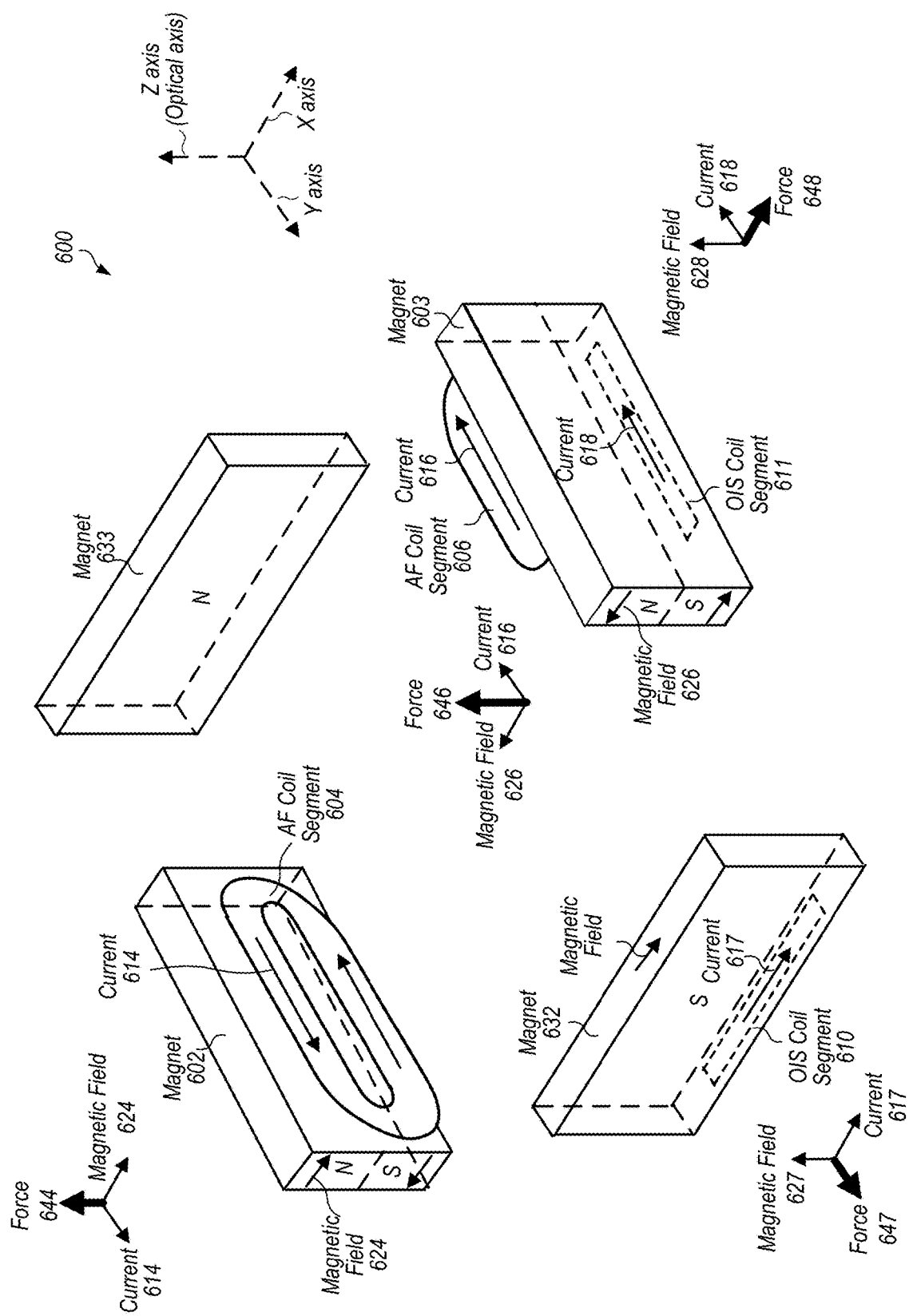
FIG. 6A illustrates a perspective view showing an example coil segment configuration of an actuator, according to some embodiments.

For purposes of illustration, FIGS. 1-5 illustrate only one or two magnets. In some embodiments, the actuator may have less or more magnets. As the magnets vary, the AF and/or OIS coil segments may change as well. FIG. 6A shows a perspective view of an example coil segment configuration of an actuator, according to some embodiments. For purposes of illustration, only magnets and coil segments of the actuator 600 are shown in FIG. 6A. In this example, the actuator 600 may include two double-pole magnets 602-603 and two single-pole magnets 632-633. The four magnets may be disposed around the actuator 600, e.g., 90-degree apart on a circle around the actuator 600. The actuator 600 may include two concentrated AF coil segments 604 and 606, wherein the coil segment 604 may be placed proximate the double-pole magnet 602 and the coil segment 606 adjacent to the double-pole magnet 603. By driving the coil segments 604 and 606 with separate currents 614 and 616, the coil segments 604 and 606 may interact respectively with the magnetic field 624 and 626 of magnets 602 and 603 to produce motive forces 644 and 646, in the directions shown in FIG. 6A. As described above, the motive forces 644 and 646 may move or tilt the lens group, e.g., the lens group 102 in FIG. 1, relative to the image sensor, e.g., the image sensor 104 in FIG. 1.

In some embodiments, the camera 600 may include an OIS coil segmented into coil segments 610 and 611. In some embodiments, the coil segments 610 and 611 may be placed underneath the single-pole magnets 632-633, respectively. The coil segments 610 and 611 may be individually driven by respective currents 617 and 618, which may interact with the magnetic fields 627 and 628 of the single-pole magnets 632-633 to produce motive forces 647 and 648, in the directions shown in FIG. 6A. The motive forces 647 and 648 may shift the image sensor relative to the lens group on the image plane, e.g., along Y and X axes, that are orthogonal to the optical axis of the lens group. Similar to FIG. 5, the arrangement of the camera 600 may allow for an autofocus tilt-shift camera system. Moreover, in some embodiments, each AF coil segment 604/606 and OIS coil segment 610/611 may comprises less or more segments. For instance, the actuator 600 may include two coil segments 604a and 604b (not shown) that are wound in a single-layer, a double-layer, or a partial double-layer configuration proximate the double pole magnet 602.

Figure 6B:
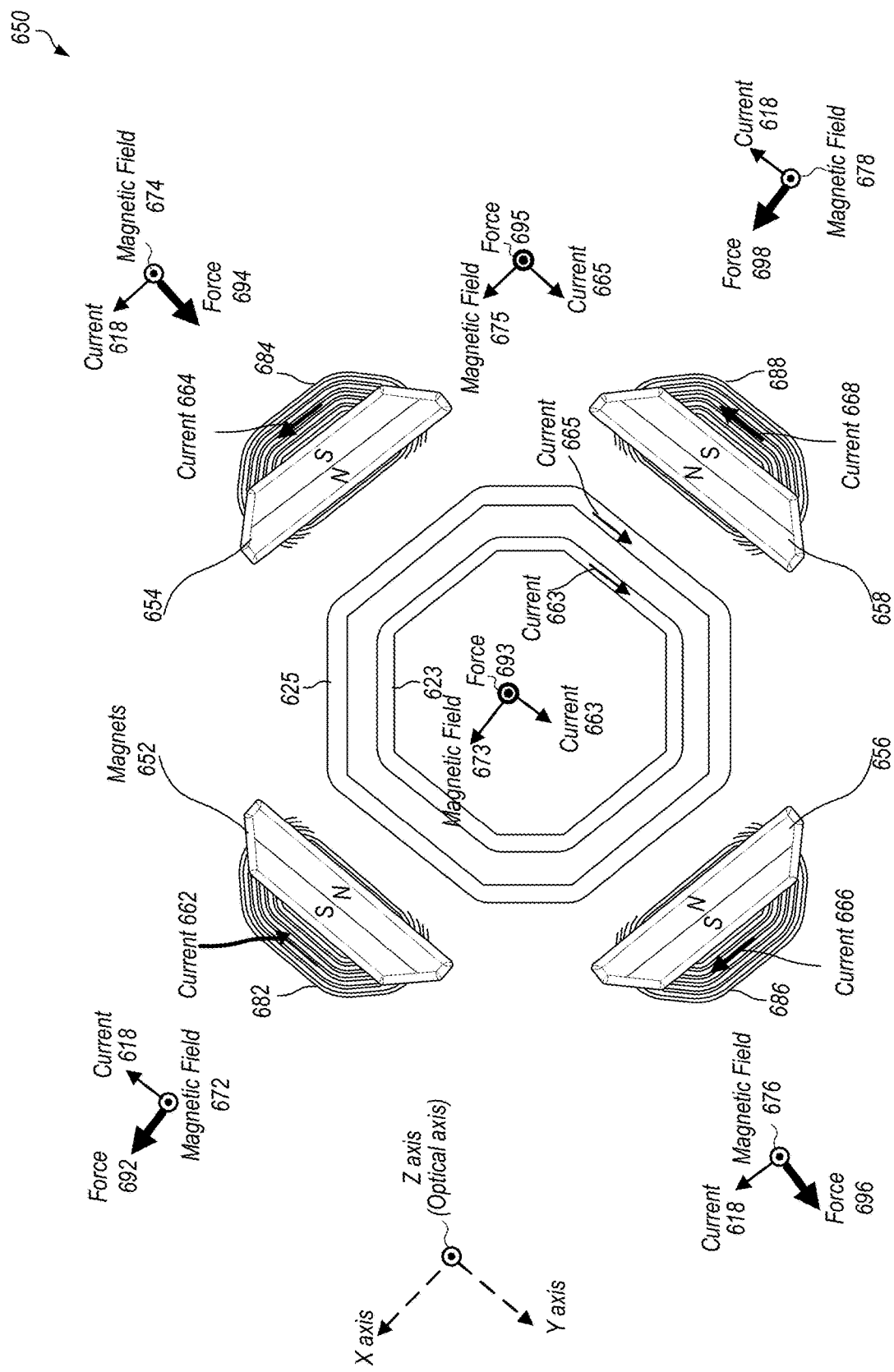
FIG. 6B illustrates a top view showing another example coil segment configuration of an actuator, according to some embodiments.

FIG. 6B shows a top view of another example coil segment configuration of an actuator, according to some embodiments. For purposes of illustration, only magnets and coil segments that are most relevant to descriptions herein are depicted in FIG. 6B. In this example shown in FIG. 6B, the actuator 650 may include magnets 652, 654, 656 and 658 positioned, e.g., at four corners of the camera. The actuator 650 may further include coil segments 623 and 625 that may be wound around the lens group of the camera, as described above with regards to FIG. 1. The coil segments 623-625 may be wound in various configurations, e.g., single layer, double layer, partial double layer configurations, etc., as described above with regards to FIGS. 2-5. In some embodiments, the actuator 650 may further include coil segments 682, 684, 686 and 688 that may be wound concentratedly proximate the magnets 652, 654, 656 and 658, e.g., underneath the magnets 652, 654, 656 and 658 respectively as shown in FIG. 6B. The coil segments 623, 625, 682, 684, 686 and 688 may be individually driven via respective currents 663, 665, 662, 664, 666 and 668, as indicated in FIG. 6B. Given the example arrangement of the magnets 652, 654, 656 and 658 in FIG. 6B, these coil segments may individually interact with the magnetic fields of the magnets 652, 654, 656 and 658 to produce motive forces. For instance, the coil segments 623 and 625 may interact with the magnetic fields 673 and 675 to produce the motive forces 693 and 695 along the Z axis, e.g., in the direction out of the page—thus moving the lens group of the camera along the Z axis relative to the image sensor to implement autofocus of the lens group, as described above. By controlling the values and polarities of the currents 663 and 665 of the coil segments 623 and 625, the values and directions of the motive forces 693 and 695 may be regulated as well. Similarly, the coil segments 682 and 688 may interact with the magnetic fields 672 and 678 to produce motive forces 692 and 698 along the X axis. The coil segments 684 and 686 may interact with the magnetic fields 674 and 676 to produce motive forces 694 and 696 along the Y axis. The motive forces 692, 694, 696 and 698 may shift the image sensor of the camera relative to the lens group to implement the OIS movements along the X-Y axis that are orthogonal to the Z axis (or optical axis) of the lens group, as described above. Again, regulating the values and polarities of the currents 662, 664, 666 and 668 of the coil segments 682, 684, 686 and 688 may allow the control of the image sensor position in OIS. Note that although the coil segments may be driven independently from each other, in some embodiments, some coil segments may be selectively combined and controlled together whilst the remaining coil segments may be driven independently. For instance, in the example shown in FIG. 6B, the autofocus coil segments 623 and 625 may be driven independently from the other coil segments, the OIS coil segments 682 and 688 may be coupled in series and driven with a first OIS current, and the OIS coil segments 684 and 686 may be coupled in series and driven with a second OIS current. The capability to selectively drive some or all of the autofocus coil segments 623 and 625 and OIS coil segments 682, 684, 686 and 688 independently may provide a maximum flexibility for position control of the lens group and/or image sensor of the camera in autofocus and OIS actions. Further, since the coil segments may individually have less impedance than respective coils in whole, this reduces the power requirements on the power supplies and also provide the possibility to increase the total motive forces for autofocus and OIS movements (e.g., the autofocus forces 693 and 695 may add up together to increase the autofocus force to move the lens group).

Figure 7A:
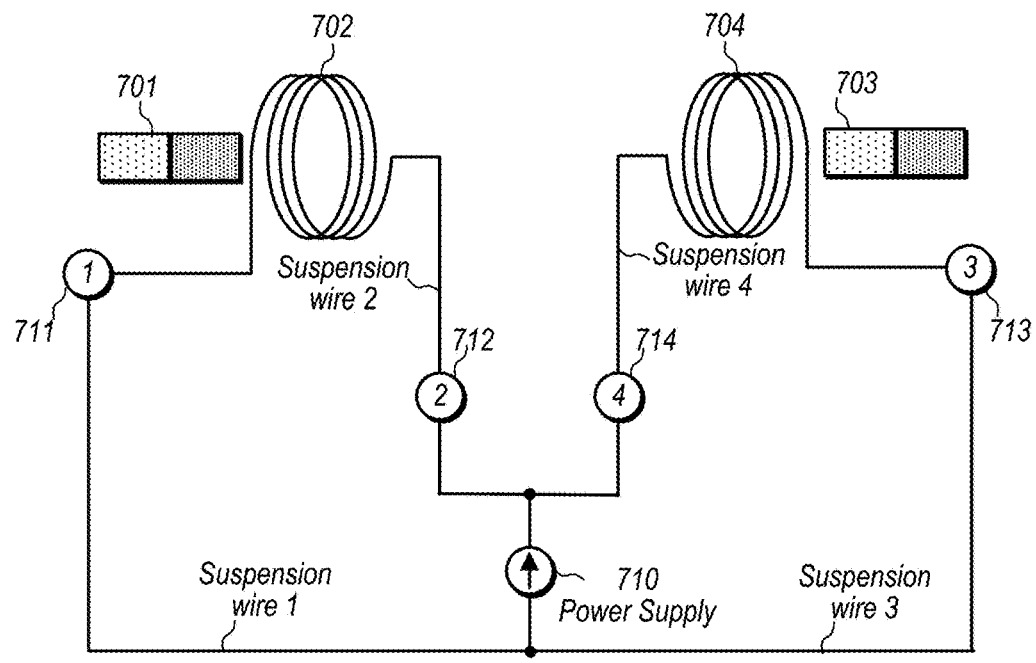
FIGS. 7A-7D are schematic diagrams illustrating connectivity examples of coil segment of an actuator, according to some embodiments.

FIG. 7A show a connectivity example of coil segments of an actuator, according to some embodiments. In FIG. 7A, two coil segments 702 and 704 may be disposed proximate magnets 701 and 703, respectively. The two coil segments 702 and 704 may each have two terminals, for instance, terminals 711-712 for coil segment 702 and terminals 713-714 for coil segment 704. In some embodiments, the coil segments 702 and 704 may connect to a supply voltage via separate current loops to enable separate current regulations for the coil segments 702 and 704. In some embodiments, coil segments 702 and 704 may be coupled to the power supply 710 in parallel. For instance, the coil segment 702 may connect to the power supply 710 through terminals 711 and 712, and the coil segment 704 may couple to the power supply 710 through terminal 713 and 714. As described above, the currents to the coil segments 702-704 may be passed through via the suspension wires of the camera. Assuming the camera has four suspension wires positioned at four corners of the camera (as described below in FIG. 8), currents to the coil segments 702-704 may be supplied from power supply 710 through the four suspension wires as indicated in FIG. 7A.

Figure 7B:
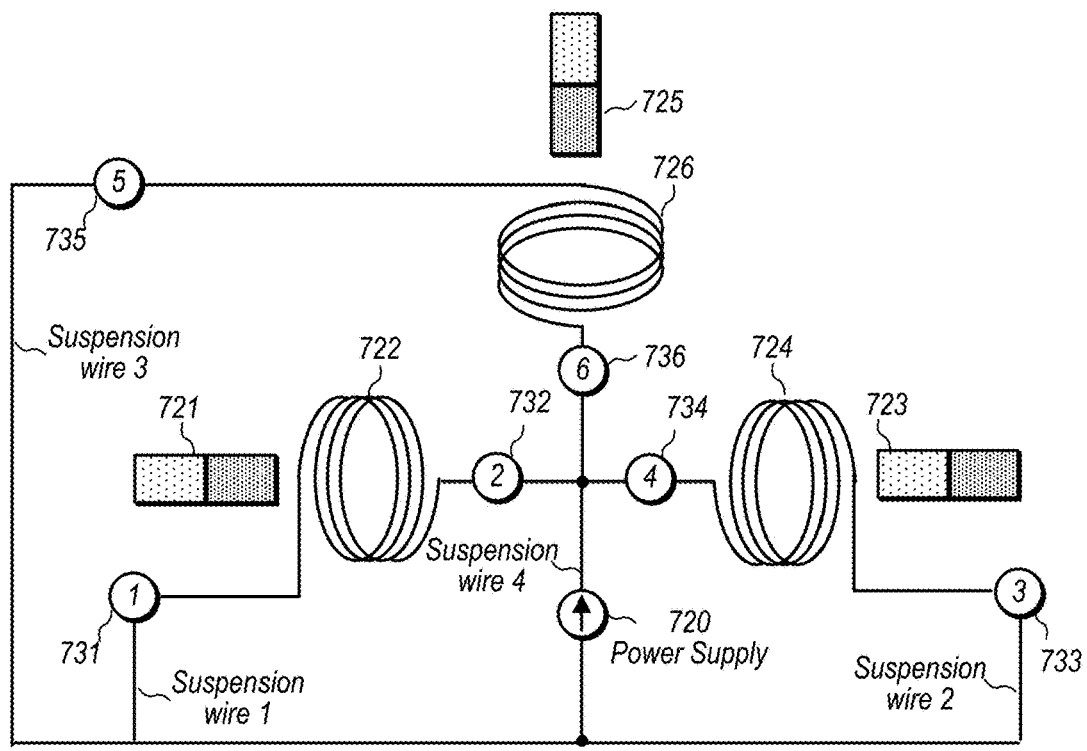

FIG. 7B shows a connectivity example for three coil segments 722, 724 and 726, according to some embodiments. In FIG. 7B, the three coil segments 722, 724 and 726 may be located proximate respective magnets 721, 723 and 725 respectively. The coil segments 722, 724 and 726 may each have two terminals, such as the terminals 731-732 for the coil segment 722, terminals 733-734 for coil segment 724, and terminals 735-736 for coil segment 726. In some embodiments, the coil segments 722, 724 and 726 may be configured to couple to a power supply 720 in parallel. For instance, the terminals 732, 734 and 736 may first be coupled together and then connected to one rail of the power supply 720; and the terminals 731, 733, and 735 may be individually coupled to the other rail of the power supply 720. Similarly, the currents to the coil segments 722, 724 and 726 may be provided by the power supply 720 through the four suspension wires, as indicated in FIG. 7B.

Figure 7C:
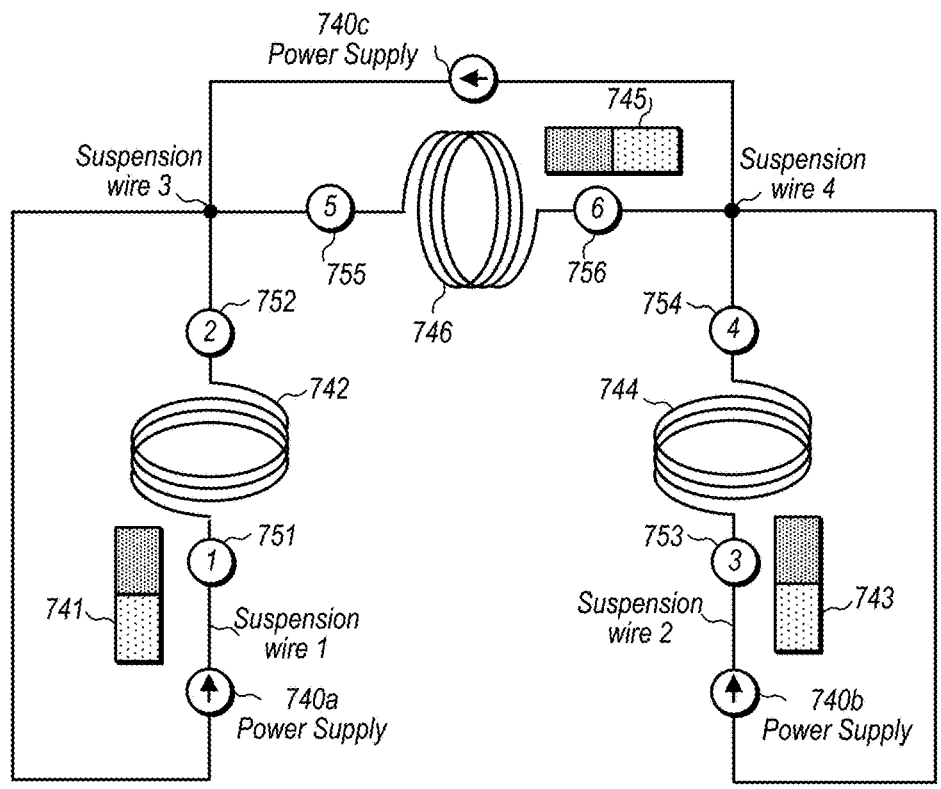

FIG. 7C shows another connectivity example for three coil segments 742, 744 and 746, according to some embodiments. In the example shown in FIG. 7C, the coil segments 742, 744 and 746 may be located proximate respective magnets 741, 743 and 745 respectively. The coil segments 742, 744 and 746 may each have two terminals, such as the terminals 751-752 for the coil segment 742, terminals 753-754 for coil segment 744, and terminals 755-756 for coil segment 746. In some embodiments, the coil segments 742, 744 and 746 may be driven individually via respective currents through terminals 751-752, 753-754, and 755-756, respectively. For instance, the coil segment 742 may be driven with a first current through power supply 740a, the coil segment 744 with a second current through power supply 740b, and the coil segment 746 with a third current through power supply 740c, as shown in FIG. 7C. For purposes of illustration, FIG. 7C shows the coil segments 742, 744 and 746 are driven with respective power supplies 740a-740c. In some embodiments, some or all of the power supplies 740a-740c may be implemented using one single power supply device with multiple outputs each having regulatable output current and/or voltage. Besides separate or combined power supply devices, what is important herein is that the coil segments 742, 744 and 746 may be driven individually with respective currents, e.g., passed through the suspension wires as indicated in FIG. 7C. In this example in FIG. 7C, the suspension wires 3 and 4 may be coupled to the joint points (e.g., suspension wire 3 coupled to the joint point of terminals 752 and 755, whilst suspension wire 4 coupled to the joint point of terminals 754 and 756), as indicated in FIG. 7C.

Figure 7D:
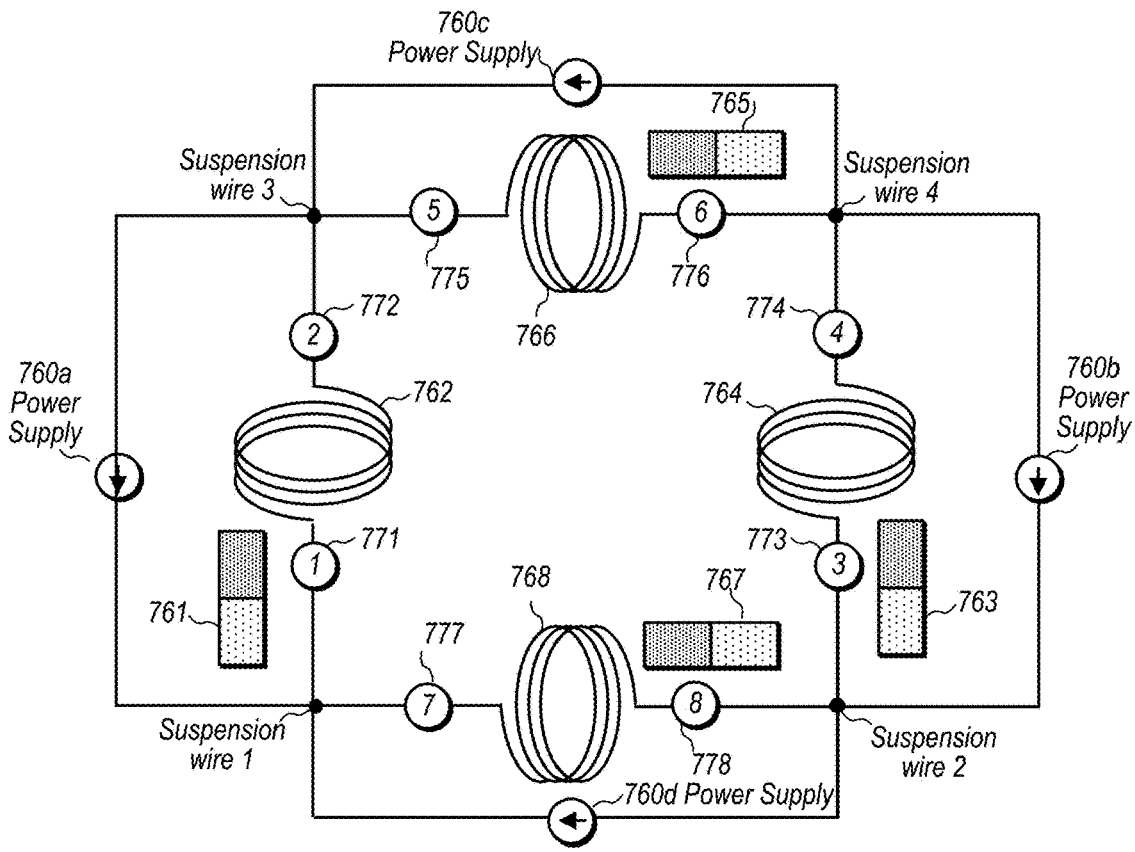

FIG. 7D shows a connectivity example for four coil segments 762, 764, 766 and 768, according to some embodiments. In the example shown in FIG. 7D, the coil segments 762, 764, 766 and 768 may be located proximate respective magnets 761, 763, 745 and 767 respectively. The coil segments 762, 764, 766 and 768 may each have two terminals, such as the terminals 771-772 for the coil segment 762, terminals 773-774 for coil segment 764, terminals 775-776 for coil segment 766, and terminals 777-778 for coil segment 768. Similar to the connectivity examples described above in FIGS. 7A-7C, the coil segments 762, 764, 766 and 768 may be individually driven via respective currents, e.g., from power supplies 760a-760d. In some embodiments, some or all of the power supplies 760a-760d may be provided by one single power supply device with multiple outputs each having regulatable output current and/or voltage. Further, the currents to the coil segments 762, 764, 766 and 768 may be also passed through the suspension wires, e.g., four suspension wires as indicated in FIG. 7D. Note that the connectivity examples in FIGS. 7A-7D are provided herein for purposes of illustrations only. In some embodiments, the camera or the actuator may have less or more coil segments than what is shown in the figures. Further, the coil segments may be autofocus coil segments to move the lens group relative to the image sensor, or they may be the OIS coil segments to shift the image sensor relative to the lens group. Further, although it is possible to drive all the coil segments separately with respective currents, in some embodiments, some of the coil segments may be selectively controlled together whilst the rest of the coil segments driven independently.

Figure 8:
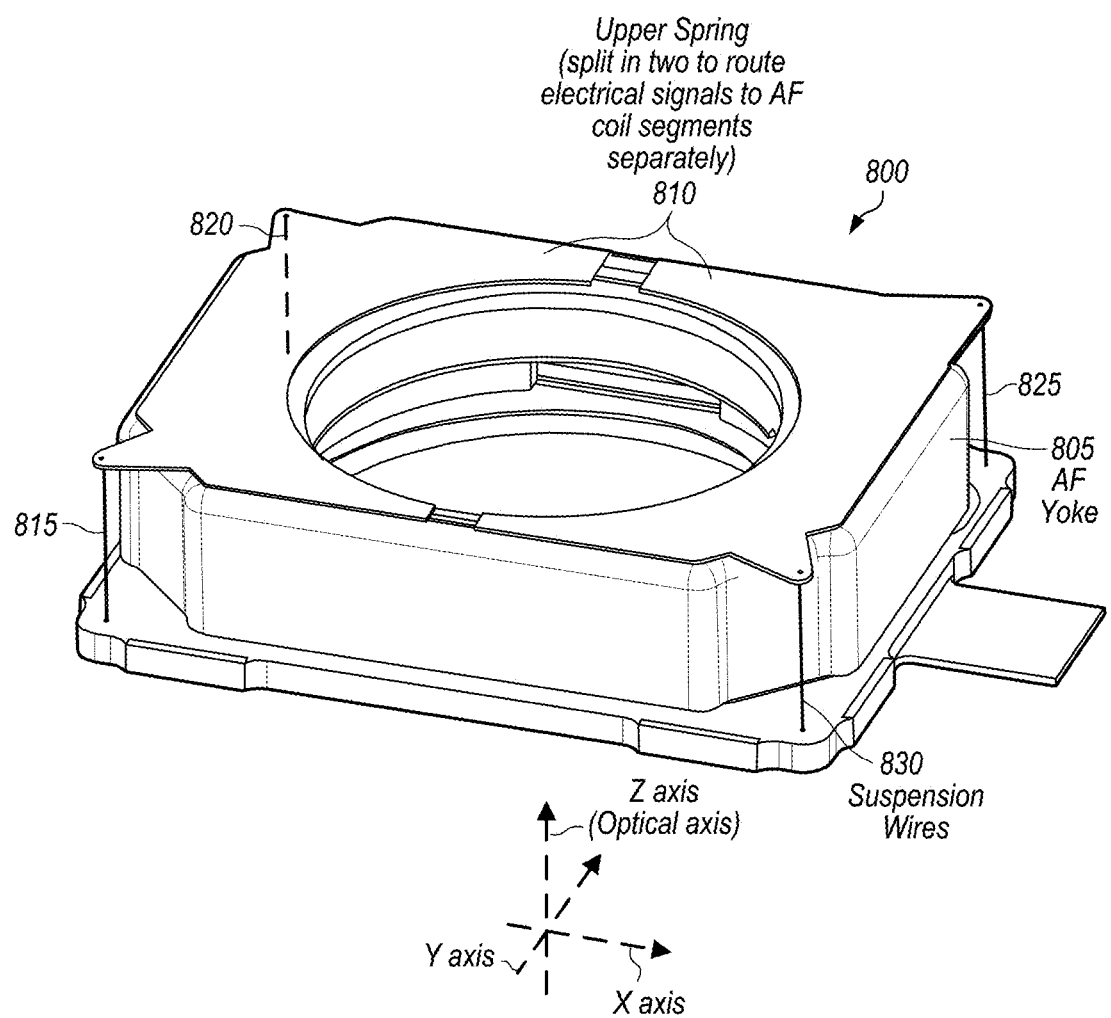
FIG. 8 is a 3D view of an example actuator with the outer screening can hidden, according to some embodiments.

FIG. 8 illustrates a 3D view of an example actuator with the outer screening can hidden, according to some embodiments. More of the mechanism can thus be observed. In some embodiments, actuator 800 includes an autofocus yoke 805, an upper spring 810, a lower spring (not visible in this view), and suspension wires 815-830. In some embodiments, the autofocus yoke 805 may acts as the support chassis structure for the lens group of the actuator 800. The lens carrier, e.g., the lens group 102 in FIG. 1, is suspended on the autofocus yoke 805 by the upper spring 810 and the lower spring. In this way when an electric current is applied to the AF coil segments, motive forces are developed to move the lens group along the optical axis. In addition to suspending the lens carrier and substantially eliminating parasitic motions, the upper spring 810 and lower spring also resist the motive forces, and hence convert the forces to a displacement of the lens.

In some embodiments, the upper spring 810 and the lower spring may be suspended on the coil structure, e.g., the coil structures 114 in FIG. 1, thus mechanically connecting the coil structure to a static member of the actuator. In some embodiments, the suspension of the lens group on the actuator 800 may be achieved by the use of four suspension wires 815-830. In some embodiments, the suspension wires 815-830 may act as a flexure beams capable of bending with relatively low stiffness, thus guiding the movement of the lens group in both optical image stabilization degrees-of-freedom, e.g., in the X-Y axes. However, suspension wires 815-830 may be in some embodiments relatively stiff in directions parallel to the optical axis or Z axis, as this would require the suspension wires to stretch or buckle, thus substantially preventing parasitic motions in these directions. In addition, the presence of four such wires, appropriately separated allows them to be stiff in the parasitic tilt directions of pitch and yaw, thus substantially preventing relative dynamic tilt between the lens and image sensor. This may be seen by appreciating that each suspension wires 815-830 is stiff in directions that require it to change in length, and hence the fixed points at the ends of each wire (eight points in total) may substantially form the vertices of a parallelepiped for all operational positions of the optical image stabilization mechanism. In some embodiments, the suspension wires 815-830 may be configured to pass electrical currents from a supply voltage, through the upper spring 805 and/or the lower spring, to the AF and/or OIS coil segments of the actuator 800. For instance, referring back to FIG. 7A, the coil segment 702 may be coupled to the supply voltage 710 by connecting the terminals 711/712 to suspension wires 815-820, whilst the coil segment 704 may be coupled to the supply voltage 710 by connecting the terminals 713/714 to suspension wires 825/830. Note that in FIG. 8, the upper spring 810 (and/or the lower spring) may be split into two parts so that the coil segments 702 and 704 are electrically disconnected from each other until they connect to the voltage rails of the supply voltage 710. By connecting the coil segments 702 and 704 separately to the supply voltage enables the coil segments 702 and 704 to be driven independently by respective currents. Similarly, referring back to FIG. 7B, the coil segment 724 may connect to the supply voltage 720 through the terminals 731/732 and suspension wires 815 and 830, the coil segment 726 through the terminals 733/734 and suspension wires 820 and 830, and the coil segment 728 through the terminals 735/736 and suspension wires 825 and 830. In other words, with regards to FIG. 7B, the suspension wire 830 may be used a common route. In that case, the upper spring 810 (and/or the lower spring) may be split into four parts (not shown) to provide the needed isolation between the suspension wires 815-830. As the coil segments 724, 726 and 728 are individually coupled to the supply voltage 720, the currents of the three coil segments 724, 726 and 728 may be regulated separately.

The various coil segment configurations shown in FIGS. 1-8 may allow for various current regulation schemes. FIG. 9A-9E shows various example current regulation schemes for two coil segments (e.g., two AF coil segments or two OIS coil segments described in FIGS. 1-8) of an actuator, according to some embodiments. Note that the principles described herein may be applied to actuators with less or more coil segments. In FIGS. 9A-9E, the horizontal axis represents time, and the vertical axis refers to the amplitude of the current. FIGS. 9A-9E include a maximum current for the two coils segments. For purposes of illustration, it is assumed in this example that the maximum currents of the two coil segments are the same. In some embodiments, the coil segments may have different maximum currents. Further, for purposes of illustration, it is assumed that the two coil segments both conduct currents in the same polarity. In some embodiments, the two coil segments may be driven with currents of different polarities. FIG. 9A shows a consecutive driving mode for the two coil segments where the two coil segments are driven consecutively time-wise. As shown in FIG. 9A, the first coil segment may be driven first (as indicated by current 905). When its current 905 reaches the maximum, the first coil segment may stop driving and the current 905 may return to zero. Consecutively, the second coil may switch to drive the movement, as indicated by current 910. In other words, in the consecutive driving mode, the actuator may first drive a first coil segment, and then stop and switch to drive the next coil segment. FIG. 9B depicts an equal parallel driving mode. In this example, the two coil segments may be driven in parallel or at the meantime, for instance, by the same amount of currents 915 and 920, especially when the two coil segments have substantially similar winding configurations. FIG. 9C depicts an unequal parallel driving mode, where the actuator also drives the two coil segments together in time or in parallel but with different amount of currents 925 and 930. Compared to the equal parallel driving mode, the unequal driving mode may be applied to two coil segments having different winding configurations, such as different numbers of turns. This way, the current for the two coil segments may be regulated in proportional to the respective numbers of turns. FIG. 9D shows a hybrid driving mode, where the actuator may first drive the first coil segment (as indicated by current 935). When the current 935 reaches the maximum current, the actuator may switch to drive the second coil segment, as indicated by current 940, to have two coil segments acting in parallel. In other words, in the hybrid mode, the actuator may drive the two coil segments in the consecutive mode first time-wise and then switch to the parallel mode. FIG. 9E shows another hybrid driving mode, according to some embodiments. FIG. 9E illustrates that the actuator may not have to wait until the first coil segment reaches the maximum current and then switch from the consecutive mode to the parallel mode. Instead, the actuator may switch the driving mode at any point in time, as needed. Further, after switching to the parallel mode, the two coil segments may be driven with equal or different amount of currents as well, as indicated by currents 945 and 950.

Compared to traditional VCM actuators, the techniques disclosed herein may control the actuator via the independently regulatable coil segments to establish different benefits. Take the AF coil with two segments as an example. When the two coil segments are wound in the single-layer configuration, as shown in FIGS. 1-2, the actuator may increase the stroke range for the autofocus movement of the lens group because the two coil segments may cover a longer moving range along the optical axis of the lens group. When the two coil segments are wound in the double-layer configuration, for instance, as shown in FIG. 3, each coil segment may cover the entire stroke range of the lens group. Thus, the actuator may achieve a maximum total motive force to move the lens group. When the two coil segments are wound in the partial double-layer configuration, for instance, as shown in FIG. 4, the overlapping section may provide a smooth handover between the two coil segments and thus result in a more linear position control sensitivity. When the two coil segments are wound in the concentrated configuration, for instance, as shown in FIGS. 5-6, the actuator may move the lens group in the optical axis for autofocus but also tilt the lens group relative to the image sensor to an angle with respect to the optical axis.

Figure 10:
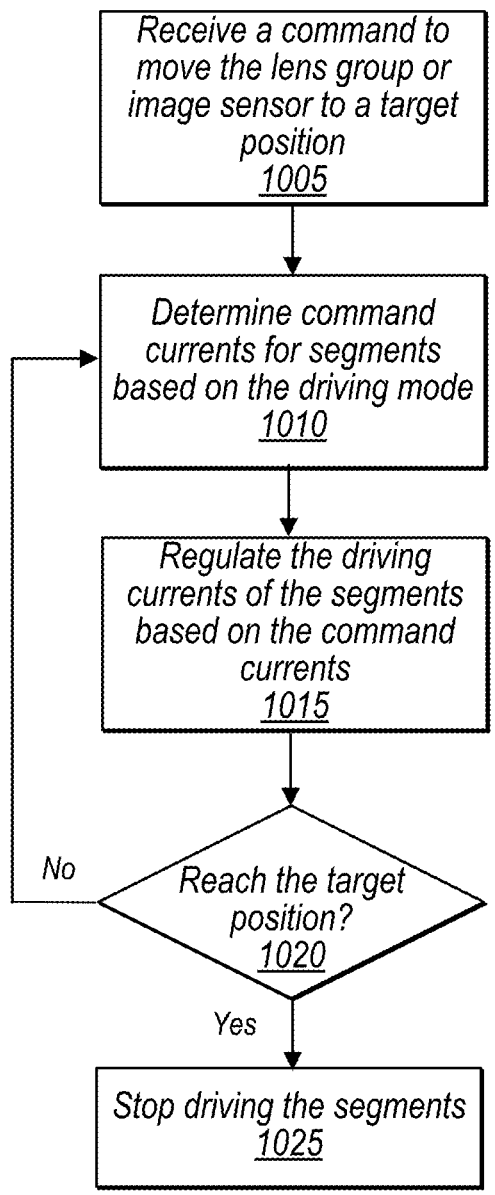
FIG. 10 is a flowchart illustrating an example operation to move the lens group or image sensor, according to some embodiments.

FIG. 10 is a flowchart illustrating an example to move the lens group or image sensor by an actuator, according to some embodiments. As described above, the lens group of a camera may be moved and/or tilt by driving the autofocus coil segments of the actuator. Further, the image sensor of the camera may be shifted by driving the OIS coil segments of the actuator. As shown in FIG. 10, the actuator may first receive a command to move (and/or tilt) the lens group and/or the image sensor of a camera system (e.g., the lens group 102 and/or the image sensor 104 in FIG. 1) to a target position (block 1005). In response, the actuator may determine command currents for the corresponding autofocus and/or OIS coil segments based on the target position and driving mode (block 1010). The driving mode may be, for instance, one of the modes described in FIGS. 9A-9E, the driving mode may be selected based on the various winding configurations of the coil segments as described above. The driving mode may allow for driving the autofocus and/or OIS coil segments with different currents and/or at different time. For instance, when a consecutive driving mode (FIG. 9A) is selected, the coil segments may be individually driven in sequence, one coil segment at one time. Alternatively, when a hybrid driving mode (FIGS. 9D-9E) is applied, the coil segments may be individually driven via the same or different currents at different points in time. The actuator may regulate the driving currents of the autofocus and/or OIS coil segments based on the command currents (block 1015). Various control algorithms may be adopted to implement the current regulation. For instance, the actuator may use proportional, proportional-integral (PI), proportional-integral-derivative (PID), ful5y logic, or artificial-intelligence (AI) controls. The actuator may monitor the movement of the lens group and/or image sensor, e.g., using autofocus and/or OIS sensor(s), to determine whether or not the lens group and/or the image sensor have arrived at the target position (block 1020). If not, the actuator may update the command currents based on the position feedback (e.g., returning to block 1010). Conversely, when it is determined that the lens group and/or image sensor arrive at the target position, the actuator may stop driving the coil segments (block 1025).

Figure 11:
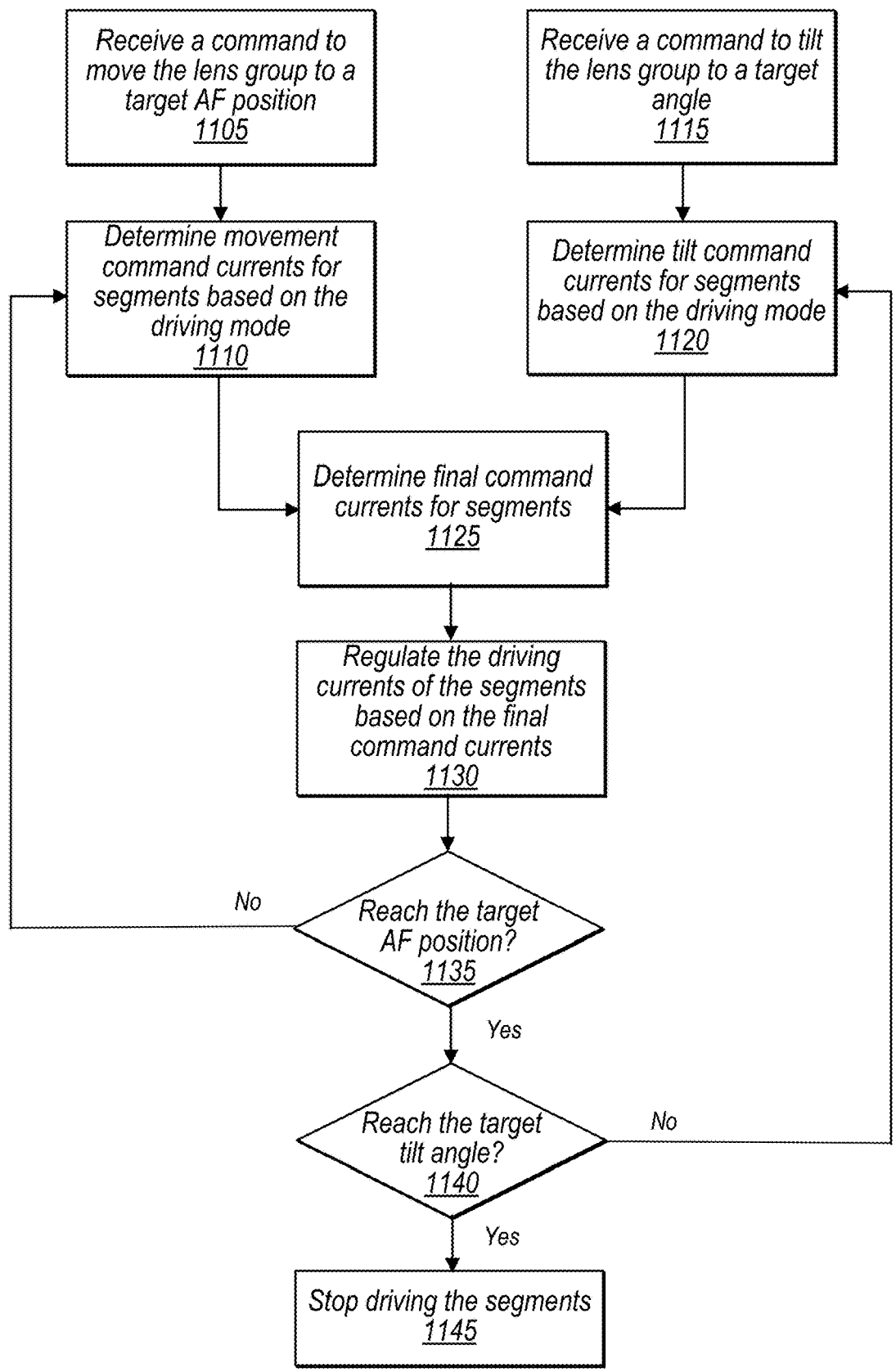
FIG. 11 is a flowchart illustrating an example operation to perform focus-tilt actions by an actuator, according to some embodiments.

FIG. 11 shows a flowchart representing an example operation to perform the focus and tilt by an actuator, according to some embodiments. As described above, the AF coil segments may be individually driven by respective current to move and/or tilt the lens groups (and the lens elements) relative to the image sensor of the camera system. In FIG. 11, the actuator may first receive a command to move the lens group and the lens elements (e.g., the lens group 102 and lens elements 108 in FIG. 1) relative to the image sensor (e.g., the image sensor 104 in FIG. 1) to a target AF position, for instance, to autofocus on an object in the view (block 1105). Responsive to the command to move the lens group, the actuator may determine movement command currents for the AF coil segments based on a driving mode (block 1110). The driving mode may be, for instance, one of the modes described in FIGS. 9A-9E, and may be selected based on the various winding configurations of the two coil segments as described above. In some embodiments, the actuator may also receive a command to tilt the lens group (and the lens elements) to a target angle, for instance, relative to the image sensor (block 1115). Responsive to the command to tilt the lens group, the actuator may determine the tilt command currents for the AF coil segments based on the selected driving mode (block 1120). For movement, the currents may be regulated to drive the AF coil segments to generate motive forces that can be added along the optical axis to move the lens group (and lens elements) relative to the image sensor substantially in a direction that is orthogonal to the image plane of the image sensor. For tilt, the AF coil segments may be driven to generate motive forces of different values and/or different polarities to tilt the lens group (and the lens elements) relative to the image sensor to an angle with respect to the optical axis of the lens group, e.g., rotating the lens group in a plane (e.g., the X-Z or Y-Z planes) that is orthogonal to the image plane of the image sensor. In some embodiments, the actuator may determine final command currents for the AF coil segments based on the movement command and tilt command currents (block 1125). For instance, the actuator may calculate a common-mode current based on the movement command currents a differential-mode current based on the tilt command currents, and determine the final command currents for the two segments based on the common- and differential-mode currents. Once the final command currents are determined, the actuator may regulate the driving currents of the coil segments based on the final command currents (block 1130). Various control algorithms may be adopted to implement the current regulation. For instance, the actuator may use proportional, proportional-integral (PI), proportional-integral-derivative (PID), ful5y logic, or artificial-intelligence (AI) controls. The actuator may track the movement of the lens group (and the lens elements), e.g., using AF position sensor(s), to determine whether or not the lens groups has arrived at the target AF position (block 1135). If not, the actuator may update the movement command currents based on the AF position measurement (e.g., returning to block 1115). Conversely, when it is determined that the lens group has arrived at the target AF position, the actuator may monitor the tilt of the lens group, e.g., based on AF tilt sensor(s), to determine whether or not the lens groups has tilted to the target tilt angle (block 1140). Responsive to determining that the lens group has not reached the target tilt angle, the actuator may update the tilt command currents based on the tilt angle feedback (e.g., returning to block 1120). Conversely, when the lens group moves to the target tilt angle, the actuator may stop driving the coil segments (block 1145).

Figure 12:
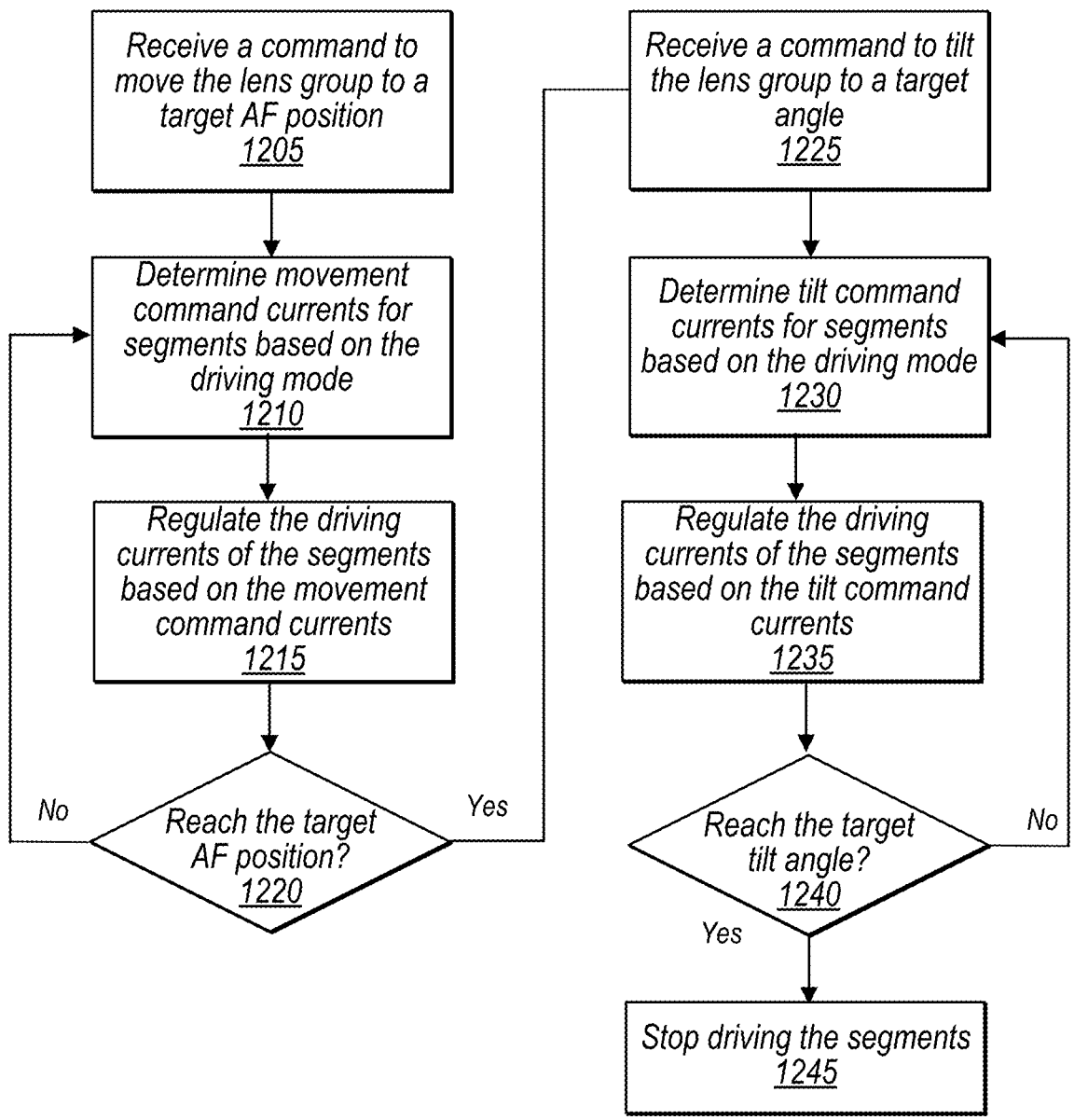
FIG. 12 is a flowchart illustrating another example operation to perform focus-tilt actions by an actuator, according to some embodiments.

FIG. 11 illustrates an example to control the AF movement and tilt together by the actuator. In some embodiments, the actuator may decouple the two functions and regulate the AF move and tilt separately. In that case, the actuator may perform the two actions in sequence, for instance, moving the lens group (and the lens elements) to a target AF position first and then tilting the lens group (and the lens elements) to a target tilt angle. In some embodiments, the actuator may perform the tilt ahead of the AF movement. FIG. 12 shows another example control scheme to implement the decoupled AF movement and tilt, according to some embodiments. In FIG. 12, the actuator may receive a command to move the lens group (and the lens elements) to a target AF position (block 1205), and determine movement command currents for the AF coil segments based on a driving mode (block 1210). As described above, the driving mode may be, for instance, one of the driving modes described in FIGS. 9A-9E and may be selected based on the winding configurations of the two coil segments. In response to the movement command currents, the actuator may regulate the driving currents of the coil segments (block 1215) and track the AF movement until the lens group (and the lens elements) reaches the target AF position (block 1220). When it is determined that the lens group (and the lens elements) have reached the target AF position, the actuator may switch to the tilt function, according to some embodiments. The actuator may receive a command to tilt the lens group (and the lens elements) to a target angle (block 1225) and determine tilt command currents for the AF coil segments based on the selected driving mode (block 1230). The actuator may regulate the driving currents of the coil segments according to the tilt command currents (block 1235) and track whether the lens group (and the lens elements) has tilted to the target angle (block 1240). The actuator may end the lens group movement when it arrives at the target tilt angle (block 1245).

Figure 13:
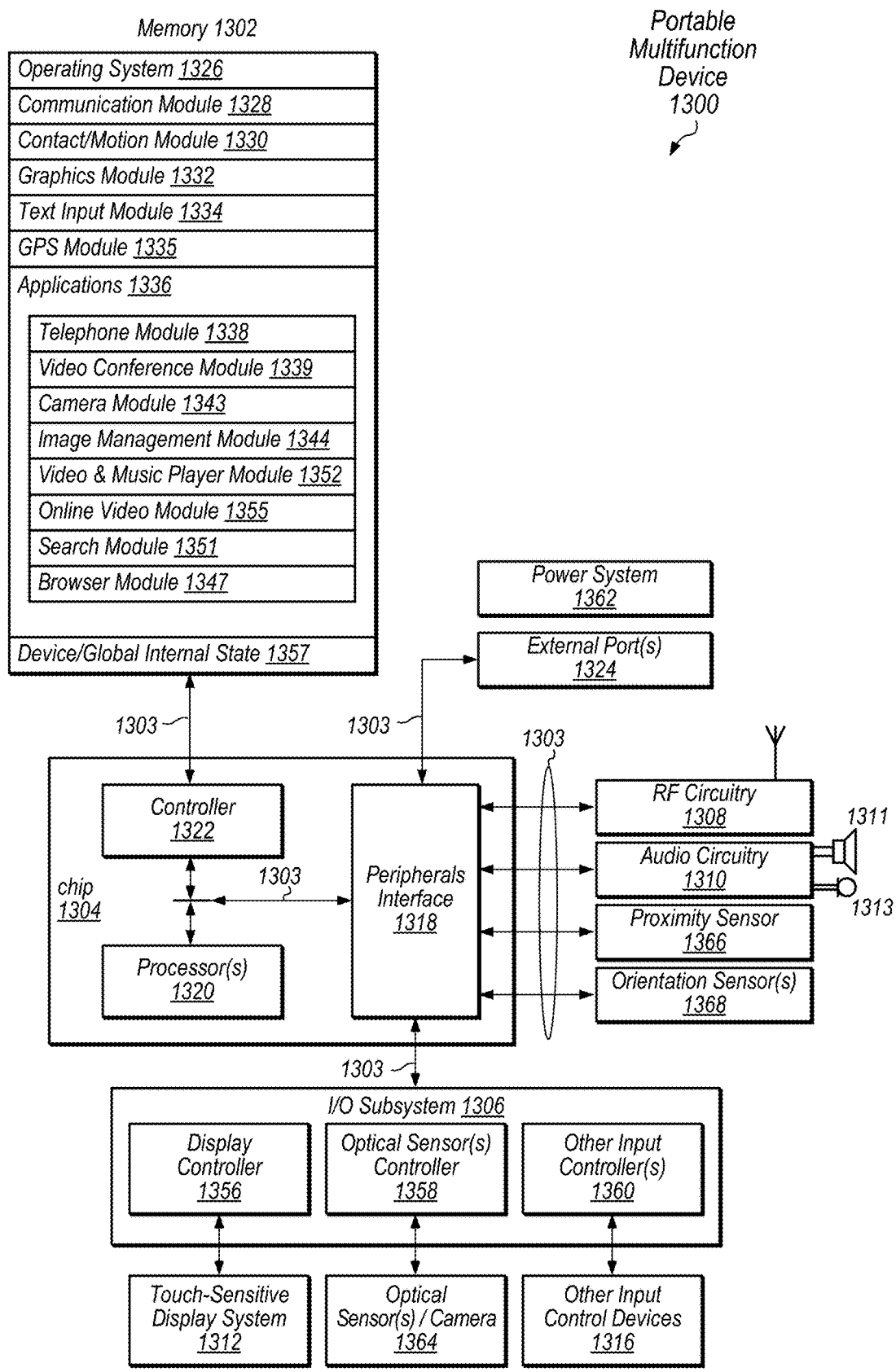
FIG. 13 illustrates a block diagram of a portable multifunction device that may include an example camera system with a multi-segment VCM actuator, in accordance with some embodiments.

Attention is now directed toward embodiments of portable devices with cameras. FIG. 13 illustrates a block diagram of an example portable multifunction device 1300 that may include a camera system with one or more multi-segment actuators (e.g., as described above with reference to FIGS. 1-12), according to some embodiments. Cameras 1364 are sometimes called "optical sensors" for convenience, and may also be known as or called an optical sensor system. Device 1300 may include memory 1302 (which may include one or more computer readable storage mediums), memory controller 1322, one or more processing units (CPUs) 1320, peripherals interface 1318, RF circuitry 1308, audio circuitry 1310, speaker 1311, touch-sensitive display system 1312, microphone 1313, input/output (I/O) subsystem 1306, other input or control devices 1316, and external port 1324. Device 1300 may include multiple. optical sensors 1364. These components may communicate over one or more communication buses or signal lines 1303.

It should be appreciated that device 1300 is only one example of a portable multifunction device, and that device 1300 may have more or fewer components than shown, may combine two or more components, or may have a different configuration or arrangement of the components. The various components shown in FIG. 13 may be implemented in hardware, software, or a combination of hardware and software, including one or more signal processing and/or application specific integrated circuits.

Memory 1302 may include high-speed random access memory and may also include non-volatile memory, such as one or more magnetic disk storage devices, flash memory devices, or other non-volatile solid-state memory devices. Access to memory 1302 by other components of device 1300, such as CPU 1320 and the peripherals interface 1318, may be controlled by memory controller 1322.

Peripherals interface 1318 can be used to couple input and output peripherals of the device to CPU 1320 and memory 1302. The one or more processors 1320 run or execute various software programs and/or sets of instructions stored in memory 1302 to perform various functions for device 1300 and to process data.

In some embodiments, peripherals interface 1318, CPU 1320, and memory controller 1322 may be implemented on a single chip, such as chip 1304. In some other embodiments, they may be implemented on separate chips.

RF (radio frequency) circuitry 1308 receives and sends RF signals, also called electromagnetic signals. RF circuitry 1308 converts electrical signals to/from electromagnetic signals and communicates with communications networks and other communications devices via the electromagnetic signals. RF circuitry 1308 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 1308 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 1302.11a, IEEE 1302.11b, IEEE 1302.11g and/or IEEE 1302.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 1310, speaker 1311, and microphone 1313 provide an audio interface between a user and device 1300. Audio circuitry 1310 receives audio data from peripherals interface 1318, converts the audio data to an electrical signal, and transmits the electrical signal to speaker 1311. Speaker 1311 converts the electrical signal to human-audible sound waves. Audio circuitry 1310 also receives electrical signals converted by microphone 1313 from sound waves. Audio circuitry 1310 converts the electrical signal to audio data and transmits the audio data to peripherals interface 1318 for processing. Audio data may be retrieved from and/or transmitted to memory 1302 and/or RF circuitry 1308 by peripherals interface 1318. In some embodiments, audio circuitry 1310 also includes a headset jack (e.g., 1412, FIG. 14). The headset jack provides an interface between audio circuitry 1310 and removable audio input/output peripherals, such as output-only headphones or a headset with both output (e.g., a headphone for one or both ears) and input (e.g., a microphone).

I/O subsystem 1306 couples input/output peripherals on device 1300, such as touch screen 1312 and other input control devices 1316, to peripherals interface 1318. I/O subsystem 1306 may include display controller 1356 and one or more input controllers 1360 for other input or control devices. The one or more input controllers 1360 receive/send electrical signals from/to other input or control devices 1316. The other input control devices 1316 may include physical buttons (e.g., push buttons, rocker buttons, etc.), dials, slider switches, joysticks, click wheels, and so forth. In some alternate embodiments, input controller(s) 1360 may be coupled to any (or none) of the following: a keyboard, infrared port, USB port, and a pointer device such as a mouse. The one or more buttons (e.g., 1408, FIG. 14) may include an up/down button for volume control of speaker 1311 and/or microphone 1313. The one or more buttons may include a push button (e.g., 1406, FIG. 14).

Touch-sensitive display 1312 provides an input interface and an output interface between the device and a user. Display controller 1356 receives and/or sends electrical signals from/to touch screen 1312. Touch screen 1312 displays visual output to the user. The visual output may include graphics, text, icons, video, and any combination thereof (collectively termed "graphics"). In some embodiments, some or all of the visual output may correspond to user-interface objects.

Touch screen 1312 has a touch-sensitive surface, sensor or set of sensors that accepts input from the user based on haptic and/or tactile contact. Touch screen 1312 and display controller 1356 (along with any associated modules and/or sets of instructions in memory 1302) detect contact (and any movement or breaking of the contact) on touch screen 1312 and converts the detected contact into interaction with user-interface objects (e.g., one or more soft keys, icons, web pages or images) that are displayed on touch screen 1312. In an example embodiment, a point of contact between touch screen 1312 and the user corresponds to a finger of the user.

Touch screen 1312 may use LCD (liquid crystal display) technology, LPD (light emitting polymer display) technology, or LED (light emitting diode) technology, although other display technologies may be used in other embodiments. Touch screen 1312 and display controller 1356 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 1312. In an example embodiment, projected mutual capacitance sensing technology is used, such as that found in the iPhone®, iPod Touch®, and iPad® from Apple Inc. of Cupertino, Calif.

Touch screen 1312 may have a video resolution in excess of 1300 dpi. In some embodiments, the touch screen has a video resolution of approximately 1360 dpi. The user may make contact with touch screen 1312 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 1300 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 1312 or an extension of the touch-sensitive surface formed by the touch screen.

Device 1300 also includes power system 1362 for powering the various components. Power system 1362 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 1300 may also include one or more optical sensors or cameras 1364. FIG. 13 shows an optical sensor 1364 coupled to optical sensor controller 1358 in I/O subsystem 1306. Optical sensor 1364 may include charge-coupled device (CCD) or complementary metal-oxide semiconductor (CMOS) phototransistors. Optical sensor 1364 receives light from the environment, projected through one or more lens, and converts the light to data representing an image. In conjunction with imaging module 1343 (also called a camera module), optical sensor 1364 may capture still images or video. In some embodiments, an optical sensor 1364 is located on the back of device 1300, opposite touch screen display 1312 on the front of the device, so that the touch screen display 1312 may be used as a viewfinder for still and/or video image acquisition. In some embodiments, another optical sensor is located on the front of the device so that the user's image may be obtained for videoconferencing while the user views the other video conference participants on the touch screen display.

Device 1300 may also include one or more proximity sensors 1366. FIG. 13 shows proximity sensor 1366 coupled to peripherals interface 1318. Alternately, proximity sensor 1366 may be coupled to input controller 1360 in I/O subsystem 1306. In some embodiments, the proximity sensor 1366 turns off and disables touch screen 1312 when the multifunction device 1300 is placed near the user's ear (e.g., when the user is making a phone call).

Device 1300 includes one or more orientation sensors 1368. In some embodiments, the one or more orientation sensors 1368 include one or more accelerometers (e.g., one or more linear accelerometers and/or one or more rotational accelerometers). In some embodiments, the one or more orientation sensors 1368 include one or more gyroscopes. In some embodiments, the one or more orientation sensors 1368 include one or more magnetometers. In some embodiments, the one or more orientation sensors 1368 include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 1300. In some embodiments, the one or more orientation sensors 1368 include any combination of orientation/rotation sensors. FIG. 13 shows the one or more orientation sensors 1368 coupled to peripherals interface 1318. Alternately, the one or more orientation sensors 1368 may be coupled to an input controller 1360 in I/O subsystem 1306. In some embodiments, information is displayed on the touch screen display 1312 in a portrait view or a landscape view based on an analysis of data received from the one or more orientation sensors 1368.

In some embodiments, the software components stored in memory 1302 include operating system 1326, communication module (or set of instructions) 1328, contact/motion module (or set of instructions) 1330, graphics module (or set of instructions) 1332, text input module (or set of instructions) 1334, Global Positioning System (GPS) module (or set of instructions) 1335, arbiter module 1358 and applications (or sets of instructions) 1336. Furthermore, in some embodiments memory 1302 stores device/global internal state 1357. Device/global internal state 1357 includes one or more of: active application state, indicating which applications, if any, are currently active; display state, indicating what applications, views or other information occupy various regions of touch screen display 1312; sensor state, including information obtained from the device's various sensors and input control devices 1316; and location information concerning the device's location and/or attitude.

Operating system 1326 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 1328 facilitates communication with other devices over one or more external ports 1324 and also includes various software components for handling data received by RF circuitry 1308 and/or external port 1324. External port 1324 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector.

Contact/motion module 1330 may detect contact with touch screen 1312 (in conjunction with display controller 1356) and other touch sensitive devices (e.g., a touchpad or physical click wheel). Contact/motion module 1330 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 1330 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 1330 and display controller 1356 detect contact on a touchpad.

Contact/motion module 1330 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 1332 includes various known software components for rendering and displaying graphics on touch screen 1312 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 1332 stores data representing graphics to be used. Each graphic may be assigned a corresponding code. Graphics module 1332 receives, from applications etc., one or more codes specifying graphics to be displayed along with, if necessary, coordinate data and other graphic property data, and then generates screen image data to output to display controller 1356.

Text input module 1334, which may be a component of graphics module 1332, provides soft keyboards for entering text in various applications (e.g., contacts 1337, e-mail 1340, IM 1341, browser 1347, and any other application that needs text input).

GPS module 1335 determines the location of the device and provides this information for use in various applications (e.g., to telephone 1338 for use in location-based dialing, to camera 1343 as picture/video metadata, and to applications that provide location-based services such as weather widgets, local yellow page widgets, and map/navigation widgets).

Applications 1336 may include the following modules (or sets of instructions), or a subset or superset thereof:
- contacts module 1337 (sometimes called an address book or contact list);
- telephone module 1338;
- video conferencing module 1339;
- e-mail client module 1340;
- instant messaging (IM) module 1341;
- workout support module 1342;
- camera module 1343 for still and/or video images;
- image management module 1344;
- browser module 1347;
- calendar module 1348;
- widget modules 1349, which may include one or more of: weather widget 1349-1, stocks widget 1349-2, calculator widget 1349-3, alarm clock widget 1349-4, dictionary widget 1349-5, and other widgets obtained by the user, as well as user-created widgets 1349-6;
- widget creator module 1350 for making user-created widgets 1349-6;
- search module 1351;
- video and music player module 1352, which may be made up of a video player module and a music player module;
- notes module 1353;
- map module 1354; and/or
- online video module 1355.

Examples of other applications 1336 that may be stored in memory 1302 include other word processing applications, other image editing applications, drawing applications, presentation applications, JAVA-enabled applications, encryption, digital rights management, voice recognition, and voice replication.

In conjunction with touch screen 1312, display controller 1356, contact module 1330, graphics module 1332, and text input module 1334, contacts module 1337 may be used to manage an address book or contact list (e.g., stored in application internal state 1357), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 1338, video conference 1339, e-mail 1340, or IM 1341; and so forth.

In conjunction with RF circuitry 1308, audio circuitry 1310, speaker 1311, microphone 1313, touch screen 1312, display controller 1356, contact module 1330, graphics module 1332, and text input module 1334, telephone module 1338 may be used to enter a sequence of characters corresponding to a telephone number, access one or more telephone numbers in address book 1337, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 1308, audio circuitry 1310, speaker 1311, microphone 1313, touch screen 1312, display controller 1356, optical sensor 1364, optical sensor controller 1358, contact module 1330, graphics module 1332, text input module 1334, contact list 1337, and telephone module 1338, videoconferencing module 1339 includes executable instructions to initiate, conduct, and terminate a video conference between a user and one or more other participants in accordance with user instructions.

In conjunction with RF circuitry 1308, touch screen 1312, display controller 1356, contact module 1330, graphics module 1332, and text input module 1334, e-mail client module 1340 includes executable instructions to create, send, receive, and manage e-mail in response to user instructions. In conjunction with image management module 1344, e-mail client module 1340 makes it very easy to create and send e-mails with still or video images taken with camera module 1343.

In conjunction with RF circuitry 1308, touch screen 1312, display controller 1356, contact module 1330, graphics module 1332, and text input module 1334, the instant messaging module 1341 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 1308, touch screen 1312, display controller 1356, contact module 1330, graphics module 1332, text input module 1334, GPS module 1335, map module 1354, and music player module 1346, workout support module 1342 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 1312, display controller 1356, optical sensor(s) 1364, optical sensor controller 1358, contact module 1330, graphics module 1332, and image management module 1344, camera module 1343 includes executable instructions to capture still images or video (including a video stream) and store them into memory 1302, modify characteristics of a still image or video, or delete a still image or video from memory 1302.

In conjunction with touch screen 1312, display controller 1356, contact module 1330, graphics module 1332, text input module 1334, and camera module 1343, image management module 1344 includes executable instructions to arrange, modify (e.g., edit), or otherwise manipulate, label, delete, present (e.g., in a digital slide show or album), and store still and/or video images.

In conjunction with RF circuitry 1308, touch screen 1312, display system controller 1356, contact module 1330, graphics module 1332, and text input module 1334, browser module 1347 includes executable instructions to browse the Internet in accordance with user instructions, including searching, linking to, receiving, and displaying web pages or portions thereof, as well as attachments and other files linked to web pages.

In conjunction with RF circuitry 1308, touch screen 1312, display system controller 1356, contact module 1330, graphics module 1332, text input module 1334, e-mail client module 1340, and browser module 1347, calendar module 1348 includes executable instructions to create, display, modify, and store calendars and data associated with calendars (e.g., calendar entries, to do lists, etc.) in accordance with user instructions.

In conjunction with RF circuitry 1308, touch screen 1312, display system controller 1356, contact module 1330, graphics module 1332, text input module 1334, and browser module 1347, widget modules 1349 are mini-applications that may be downloaded and used by a user (e.g., weather widget 1349-1, stocks widget 1349-2, calculator widget 1349-3, alarm clock widget 1349-4, and dictionary widget 1349-5) or created by the user (e.g., user-created widget 1349-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 1308, touch screen 1312, display system controller 1356, contact module 1330, graphics module 1332, text input module 1334, and browser module 1347, the widget creator module 1350 may be used by a user to create widgets (e.g., turning a user-specified portion of a web page into a widget).

In conjunction with touch screen 1312, display system controller 1356, contact module 1330, graphics module 1332, and text input module 1334, search module 1351 includes executable instructions to search for text, music, sound, image, video, and/or other files in memory 1302 that match one or more search criteria (e.g., one or more user-specified search terms) in accordance with user instructions.

In conjunction with touch screen 1312, display system controller 1356, contact module 1330, graphics module 1332, audio circuitry 1310, speaker 1311, RF circuitry 1308, and browser module 1347, video and music player module 1352 includes executable instructions that allow the user to download and play back recorded music and other sound files stored in one or more file formats, such as MP3 or AAC files, and executable instructions to display, present or otherwise play back videos (e.g., on touch screen 1312 or on an external, connected display via external port 1324). In some embodiments, device 1300 may include the functionality of an MP3 player.

In conjunction with touch screen 1312, display controller 1356, contact module 1330, graphics module 1332, and text input module 1334, notes module 1353 includes executable instructions to create and manage notes, to do lists, and the like in accordance with user instructions.

In conjunction with RF circuitry 1308, touch screen 1312, display system controller 1356, contact module 1330, graphics module 1332, text input module 1334, GPS module 1335, and browser module 1347, map module 1354 may be used to receive, display, modify, and store maps and data associated with maps (e.g., driving directions; data on stores and other points of interest at or near a particular location; and other location-based data) in accordance with user instructions.

In conjunction with touch screen 1312, display system controller 1356, contact module 1330, graphics module 1332, audio circuitry 1310, speaker 1311, RF circuitry 1308, text input module 1334, e-mail client module 1340, and browser module 1347, online video module 1355 includes instructions that allow the user to access, browse, receive (e.g., by streaming and/or download), play back (e.g., on the touch screen or on an external, connected display via external port 1324), send an e-mail with a link to a particular online video, and otherwise manage online videos in one or more file formats, such as H.264. In some embodiments, instant messaging module 1341, rather than e-mail client module 1340, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 1302 may store a subset of the modules and data structures identified above. Furthermore, memory 1302 may store additional modules and data structures not described above.

In some embodiments, device 1300 is a device where operation of a predefined set of functions on the device is performed exclusively through a touch screen and/or a touchpad. By using a touch screen and/or a touchpad as the primary input control device for operation of device 1300, the number of physical input control devices (such as push buttons, dials, and the like) on device 1300 may be reduced.

The predefined set of functions that may be performed exclusively through a touch screen and/or a touchpad include navigation between user interfaces. In some embodiments, the touchpad, when touched by the user, navigates device 1300 to a main, home, or root menu from any user interface that may be displayed on device 1300. In such embodiments, the touchpad may be referred to as a "menu button." In some other embodiments, the menu button may be a physical push button or other physical input control device instead of a touchpad.

Figure 14:
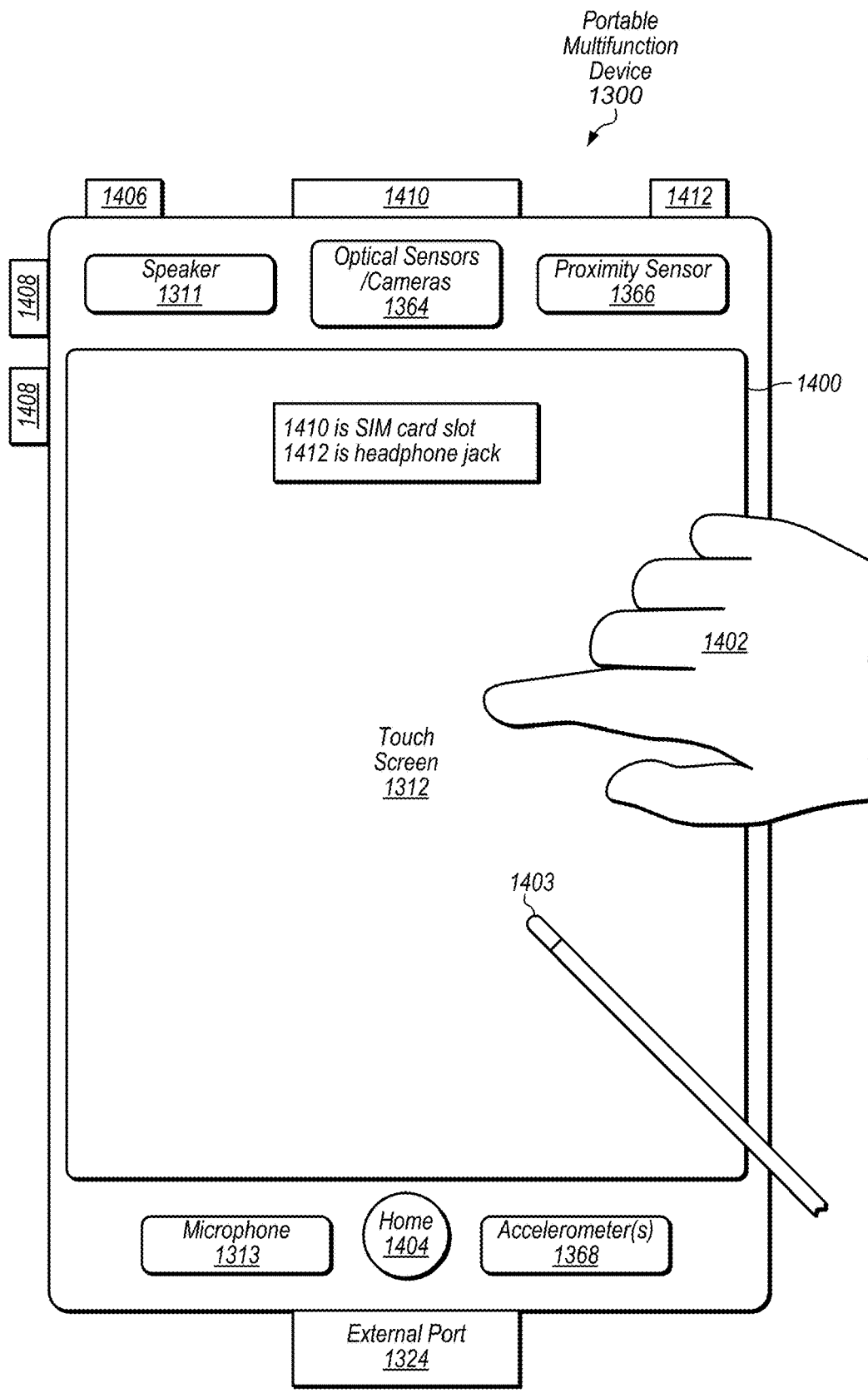
FIG. 14 illustrates a portable multifunction device that may include an example camera system with a multi-segment VCM actuator, in accordance with some embodiments.

FIG. 14 depicts illustrates an example portable multifunction device 1300 that may include a camera system with one or more multi-segment actuators (e.g., as described above with reference to FIGS. 1-12), according to some embodiments. The device 1300 may have a touch screen 1312. The touch screen 1312 may display one or more graphics within user interface (UI) 1400. In this embodiment, as well as others described below, a user may select one or more of the graphics by making a gesture on the graphics, for example, with one or more fingers 1402. (not drawn to scale in the figure) or one or more styluses 1403 (not drawn to scale in the figure).

Device 1300 may also include one or more physical buttons, such as "home" or menu button 1404. As described previously, menu button 1404 may be used to navigate to any application 1336 in a set of applications that may be executed on device 1300. Alternatively, in some embodiments, the menu button 1404 is implemented as a soft key in a GUI displayed on touch screen 1312.

In one embodiment, device 1300 includes touch screen 1312, menu button 1404, push button 1406 for powering the device on/off and locking the device, volume adjustment button(s) 1408, Subscriber Identity Module (SIM) card slot 1410, head set jack 1412, and docking/charging external port 1424. Push button 1406 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 1300 also may accept verbal input for activation or deactivation of some functions through microphone 1313.

It should be noted that, although many of the examples herein are given with reference to optical sensor(s)/camera(s) 1364 (on the front of a device), one or more rear-facing cameras or optical sensors that are pointed opposite from the display may be used instead of, or in addition to, an optical sensor(s)/camera(s) 1364 on the front of a device.

Example Computer System

Figure 15:
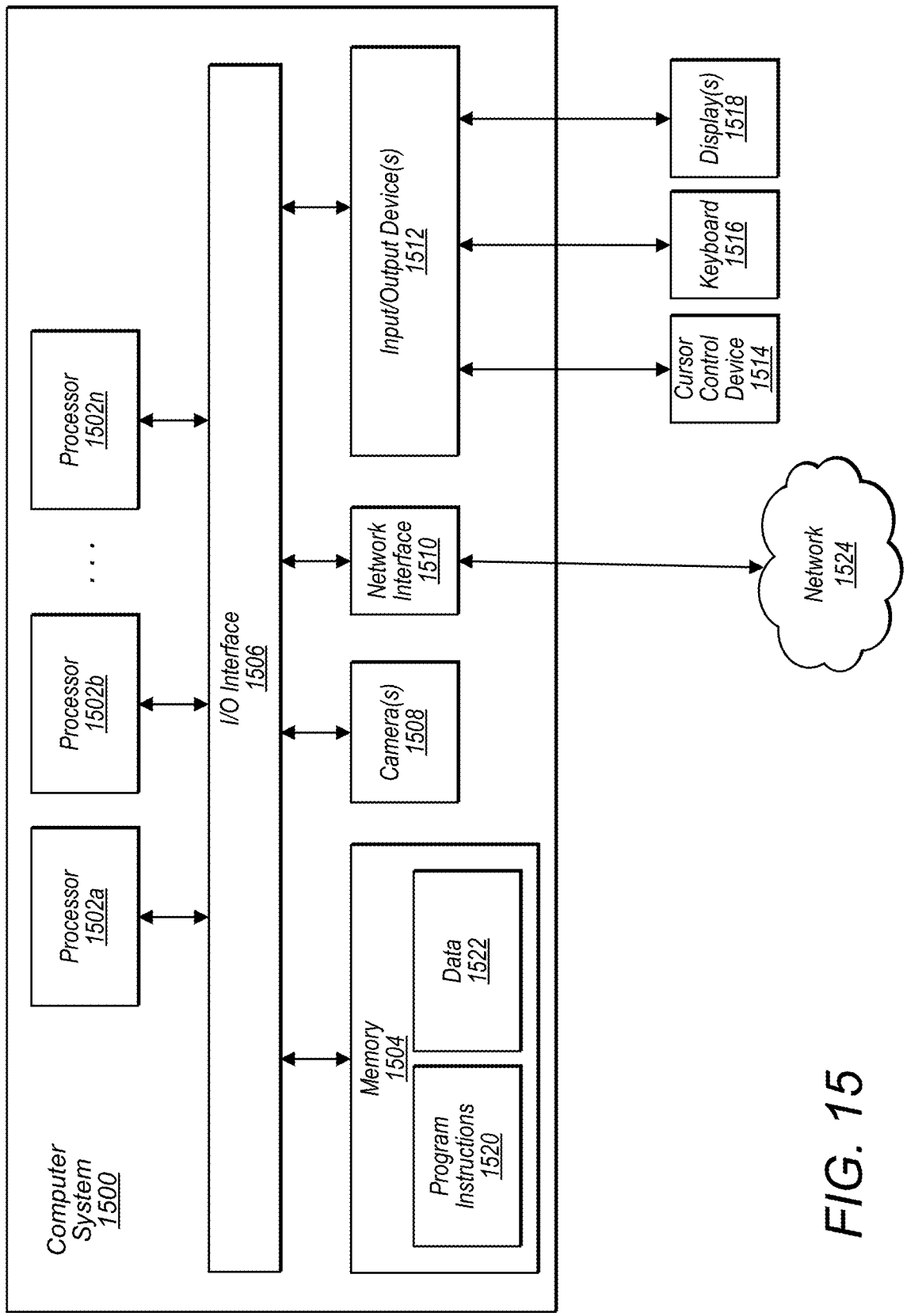
FIG. 15 illustrates an example computer system that may include an example camera system with a multi-segment VCM actuator, in accordance with some embodiments.

FIG. 15 illustrates an example computing device, referred to as computer system 1500, that may include or host embodiments of a camera system having an actuator arrangement as described above with reference to FIGS. 1-14. In addition, computer system 1500 may implement methods for controlling operations of the camera and/or for performing image processing images captured with the camera.

The computer system 1500 may be configured to execute any or all of the embodiments described above. In different embodiments, computer system 1500 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 1500 includes one or more processors 1502 coupled to a system memory 1504 via an input/output (I/O) interface 1506. Computer system 1500 further includes one or more cameras 1508 coupled to the I/O interface 1506. Computer system 1500 further includes a network interface 1510 coupled to I/O interface 1506, and one or more input/output devices 1512, such as cursor control device 1514, keyboard 1516, and display(s) 1518. In some cases, it is contemplated that embodiments may be implemented using a single instance of computer system 1500, while in other embodiments multiple such systems, or multiple nodes making up computer system 1500, may be configured to host different portions or instances of embodiments. For example, in one embodiment some elements may be implemented via one or more nodes of computer system 1500 that are distinct from those nodes implementing other elements.

In various embodiments, computer system 1500 may be a uniprocessor system including one processor 1502, or a multiprocessor system including several processors 1502 (e.g., two, four, eight, or another suitable number). Processors 1502 may be any suitable processor capable of executing instructions. For example, in various embodiments processors 1502 may be general-purpose or embedded processors implementing any of a variety of instruction set architectures (ISAs), such as the x86, PowerPC, SPARC, or MIPS ISAs, or any other suitable ISA. In multiprocessor systems, each of processors 1502 may commonly, but not necessarily, implement the same ISA.

System memory 1504 may be configured to store program instructions 1520 accessible by processor 1502. In various embodiments, system memory 1504 may be implemented using any suitable memory technology, such as static random access memory (SRAM), synchronous dynamic RAM (SDRAM), nonvolatile/Flash-type memory, or any other type of memory. Additionally, existing camera control data 1522 of memory 1504 may include any of the information or data structures described above. In some embodiments, program instructions 1520 and/or data 1522 may be received, sent or stored upon different types of computer-accessible media or on similar media separate from system memory 1504 or computer system 1500. In various embodiments, some or all of the functionality described herein may be implemented via such a computer system 1500.

In one embodiment, I/O interface 1506 may be configured to coordinate I/O traffic between processor 1502, system memory 1504, and any peripheral devices in the device, including network interface 1510 or other peripheral interfaces, such as input/output devices 1512. In some embodiments, I/O interface 1506 may perform any necessary protocol, timing or other data transformations to convert data signals from one component (e.g., system memory 1504) into a format suitable for use by another component (e.g., processor 1502). In some embodiments, I/O interface 1506 may include support for devices attached through various types of peripheral buses, such as a variant of the Peripheral Component Interconnect (PCI) bus standard or the Universal Serial Bus (USB) standard, for example. In some embodiments, the function of I/O interface 1506 may be split into two or more separate components, such as a north bridge and a south bridge, for example. Also, in some embodiments some or all of the functionality of I/O interface 1506, such as an interface to system memory 1504, may be incorporated directly into processor 1502.

Network interface 1510 may be configured to allow data to be exchanged between computer system 1500 and other devices attached to a network 1524 (e.g., carrier or agent devices) or between nodes of computer system 1500. Network 1524 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1510 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1512 may, in some embodiments, include one or more display terminals, keyboards, keypads, touchpads, scanning devices, voice or optical recognition devices, or any other devices suitable for entering or accessing data by one or more computer systems 1500. Multiple input/output devices 1512 may be present in computer system 1500 or may be distributed on various nodes of computer system 1500. In some embodiments, similar input/output devices may be separate from computer system 1500 and may interact with one or more nodes of computer system 1500 through a wired or wireless connection, such as over network interface 1510.

Those skilled in the art will appreciate that computer system 1500 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1500 may be transmitted to computer system 1500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The various systems and methods as illustrated in the figures and described herein represent example embodiments of methods. The systems and methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly.

What is claimed is:

1. A device, comprising:
a lens group comprising one or more lens elements;
an image sensor; and
a voice coil motor (VCM) actuator configured to move at least one of the lens group or the image sensor, the VCM actuator comprising:
one or more magnets; and
a coil segmented into multiple coil segments including a first and second coil segments that individually have a respective impedance that is lower than the coil as a whole; and
one or more processors configured to drive the first and second coil segments individually via respective currents at different points in time so that the first and second coil segments individually electromagnetically interact with the one or more magnets to produce motive forces along a same axis to move at least one of the lens group or the image sensor.

2. The device of claim 1, wherein the first coil segment connects to a supply voltage through a first and second suspension wires of the VCM actuator and the second coil segment connects to the supply voltage through a third and fourth suspension wires of the VCM actuator, and wherein the first, second, third, and fourth suspension wires are configured to mechanically connect a static portion to a lens carrier configured to carry the lens group of the VCM actuator so as to guide movement of the lens group along directions orthogonal to an optical axis of the lens group.

3. The device of claim 1, wherein the first and second coil segments are wound around a perimeter of the lens group in a double-layer configuration in which the first coil segment overlaps the second coil segment.

4. The device of claim 1, wherein the first and second coil segments are wound around a perimeter of the lens group in a partial double-layer configuration in which a first portion of the first coil segment is disjoint from a first portion of the second coil segment and a second portion of the first coil segment overlaps a second portion of the second coil segment.

5. The device of claim 1, wherein the first and second coil segments are wound around a perimeter of the lens group in a single-layer configuration in which the first coil segment is disjoint from the second coil segment.

6. The device of claim 1, wherein the first coil segment is wound concentratedly proximate a first magnet of the one or more magnets in a plane in parallel to an optical axis of the lens group, and wherein the second coil segment is wound concentratedly proximate a second magnet of the one or more magnets in the plane.

7. The device of claim 6, wherein the first and second coil segments are configured to produce motive forces having at least one of different values or different polarities so as to tilt the lens group relative to the image sensor.

8. The device of claim 1, wherein the same axis is parallel to an optical axis of the lens group so as to move the lens group along the same axis with respect to the image sensor.

9. The device of claim 1, wherein the same axis is orthogonal to an optical axis of the lens group.

10. The device of claim 9, wherein the first and second coil segments are configured to produce motive forces to shift the image sensor in directions orthogonal to the optical axis of the lens group.

11. A voice coil motor (VCM) actuator of a camera system, comprising:
   one or more magnets; and
   a coil segmented into multiple coil segments including a first and second coil segments that individually have a respective impedance that is lower than the coil as a whole, wherein the first and second coil segments are positioned proximate one or more same ones of the magnets, and wherein the first and second coil segments are configured to be individually driven via respective currents at different points in time so that the first and second coil segments electromagnetically interact with the one or more same ones of the magnets to produce motive forces along a same axis to move at least one of a lens group or an image sensor of the camera system.

12. The VCM actuator of claim 11, wherein the first coil segment connects to a supply voltage through a first and second suspension wires of the VCM actuator and the second coil segment connects to the supply voltage through a third and fourth suspension wires of the VCM actuator, and wherein the first, second, third, and fourth suspension wires are configured to mechanically connect a static portion of the camera system to a lens carrier configured to carry the lens group of the VCM actuator so as to guide movement of the lens group along directions orthogonal to an optical axis of the lens group.

13. The VCM actuator of claim 11, wherein the first and second coil segments are wound around a perimeter of the lens group of the camera system in one of configurations including:
   a double-layer configuration in which the first coil segment overlaps the second coil segment,
   a partial double-layer configuration in which a first portion of the first coil segment is disjoint from a first portion of the second coil segment and a second portion of the first coil segment overlaps a second portion of the second coil segment, and
   a single-layer configuration in which the first coil segment is disjoint from the second coil segment.

14. The VCM actuator of claim 11, wherein the first coil segment is wound concentratedly proximate a first magnet of the one or more magnets in a plane in parallel to an optical axis of the lens group, and wherein the second coil segment is wound concentratedly proximate a second magnet of the one or more magnets in the plane.

15. The VCM actuator of claim 11, wherein the same axis is parallel to an optical axis of the lens group of the camera system so as to move the lens group along the same axis with respect to the image sensor of the camera system or tilt the lens group relative to the image sensor of the camera system.

16. The VCM actuator of claim 11, wherein the same axis is orthogonal to an optical axis of the lens group of the camera system.

17. The VCM actuator of claim 16, wherein the first and second coil segments are configured to produce motive forces to shift the image sensor in directions orthogonal to the optical axis of the lens group.

18. A method for controlling a voice coil motor (VCM) actuator of a camera system, comprising:
   driving multiple coil segments of a coil of the VCM actuator including a first and second coil segments individually with respective currents at different points in time so that the first and second coil segments electromagnetically interact with one or more magnets in the VCM actuator to produce motive forces along a same axis to move at least one of a lens group or an image sensor of the camera system,
   wherein the multiple coil segments individually have a respective impedance that is lower than the coil as a whole, and
   wherein the first coil segment connects to a supply voltage through a first and second suspension wires of the VCM actuator and the second coil segment connects to the supply voltage through a third and fourth suspension wires of the VCM actuator.

19. The method of claim 18, wherein the multiple coil segments are driven to produce the motive forces so that the same axis is parallel to an optical axis of the lens group of the camera system so as to move the lens group along the same axis with respect to the image sensor of the camera system or tilt the lens group relative to the image sensor of the camera system.

20. The method of claim 18, wherein the multiple coil segments are driven to produce the motive forces so that the same axis is orthogonal to an optical axis of the lens group of the camera system.

* * * * *